(12) United States Patent
Goin et al.

(10) Patent No.: US 7,203,864 B2
(45) Date of Patent: Apr. 10, 2007

(54) METHOD AND SYSTEM FOR CLUSTERING COMPUTERS INTO PEER GROUPS AND COMPARING INDIVIDUAL COMPUTERS TO THEIR PEERS

(75) Inventors: Todd Mitchell Goin, Loveland, CO (US); Randall Bruce Campbell, Fort Collins, CO (US); James Richard Stinger, Palo Alto, CA (US); Thomas Elliott Fawcett, Mountain View, CA (US); Douglas William Steele, Fort Collins, CO (US); Nina Mishra, San Ramon, CA (US); Henri Jacques Suermondt, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 511 days.

(21) Appl. No.: 10/876,865

(22) Filed: Jun. 25, 2004

(65) Prior Publication Data
US 2005/0289071 A1    Dec. 29, 2005

(51) Int. Cl.
*G06F 11/00* (2006.01)
(52) U.S. Cl. ............................ 714/26; 714/37; 702/183
(58) Field of Classification Search ................. 714/26, 714/37; 702/183, 184
See application file for complete search history.

(56) References Cited

U.S. PATENT DOCUMENTS

| | | | |
|---|---|---|---|
| 5,463,768 A * | 10/1995 | Cuddihy et al. ............... 714/37 |
| 5,511,191 A * | 4/1996 | de Leeuw van Weenen et al. ........ 707/100 |
| 6,038,677 A * | 3/2000 | Lawlor et al. .................. 714/4 |
| 6,170,065 B1 * | 1/2001 | Kobata et al. .................. 714/7 |
| 6,301,612 B1 * | 10/2001 | Selitrennikoff et al. ..... 709/220 |
| 6,826,715 B1 * | 11/2004 | Meyer et al. .................. 714/37 |
| 6,836,750 B2 * | 12/2004 | Wong et al. ................. 702/186 |
| 6,990,602 B1 * | 1/2006 | Skinner et al. ................. 714/4 |
| 7,124,322 B1 * | 10/2006 | Backman ...................... 714/15 |
| 2001/0001851 A1 * | 5/2001 | Piety et al. .................. 702/184 |
| 2001/0005821 A1 * | 6/2001 | Ottosson ..................... 702/185 |

\* cited by examiner

Primary Examiner—Gabriel L. Chu

(57) ABSTRACT

A method and system for identifying clusters of similarly-configured computers. The method, for example, comprises gathering system and business configuration information values from a set of computers. Next, at least a portion of the system and business configuration information values gathered from the set of computers is analyzed along with the numbers of computers that are configured in various ways. Then, using the result of the analysis as a guide, logical expressions of configuration information values are selected for use as definitions of one or more clusters of similarly-configured computers, the selection process generally maximizing the number of computers included within each cluster and also generally maximizing the number of configuration information value specifications included within the definition of each cluster. Then, for one or more clusters so defined and selected, one or more statistics or limit values are generated from one or more configuration information values or both gathered from the subset of computers included in the one or more clusters.

41 Claims, 9 Drawing Sheets

METHOD AND SYSTEM FOR CLUSTERING COMPUTERS INTO PEER GROUPS AND COMPARING INDIVIDUAL COMPUTERS TO THEIR PEERS

CROSS-REFERENCE TO RELATED PATENT APPLICATIONS

This application incorporates by reference for all purposes the specification and drawings of: Van Giel, et al. patent application Ser. No. 09/851,963, filed May 10, 2001 and published Nov. 14, 2002 as U.S. Application Publication No. U.S. 2002/0169738; Carr, et al. U.S. patent application Ser. No. 10/225,785 filed on Aug. 2, 2002; and Mishra, et al. U.S. patent application Ser. No. 10/448,899 filed on May 30, 2003 and entitled "A Method and System for Finding Conjunctive Clusters." All of these patents and applications, as well as the present application, are owned by the same assignee.

BACKGROUND OF THE INVENTION

The present invention relates generally to providing management, maintenance, and support of both hardware and software on computers. In particular, it relates to a method and system that enable individual computers to be compared with peer group computers to speed up and to improve the quality of troubleshooting, maintenance, and support.

As the cost of PCs and servers falls lower and lower, and as more and more PCs and servers are placed into service within businesses and organizations of all kinds, the problem of managing the configurations of and diagnosing the problems within those computers, repairing them, upgrading them, and keeping them running becomes more and more difficult. Increasingly, particularly with respect to servers which are often used in very large numbers, the complexity and the cost of the service needed to keep computers running is coming to be an important issue.

In recent years, several steps have been taken to cut the cost of managing computers. For example, a user may now click on an icon and type out a "trouble" message on the screen of a PC or workstation. That message, together with a record of the configuration of the computer and the identity (name, telephone number, e-mail address) of the user is then automatically routed to a central site where service technicians are presented not just with the user's message but also with a detailed report of the current status of the computer. The service representative can then respond with an e-mail message, with a telephone call, or with a live, on-screen "chat." The service representative may also take over control of the user's computer just as if the service representative were seated at the computer, rather then being at a central site many miles away.

Another advance has been the ability to have software data collectors installed on computers within an enterprise. These can run all manner of software (programs and script files) on each computer within an enterprise, gather all manner of data concerning how the computers are configured, and transmit records containing this data to a central site where sophisticated analyzers can sift through all of this data looking for anomalous conditions or other issues which can then be automatically reported in special reports. Centrally located auditors also may ask for the one-time execution of special sets of collectors to gather data for inclusion in special types of reports. Thus, the configuration and operative state of remotely-located computers can be determined quickly and in an automated fashion.

Computers can also be clustered into groups of computers that back each other up in a fully-automated fashion, with a computer that fails or that is not performing properly automatically switched out of service and replaced with another backup computer. This can keep critical services fully operative even when some computers are placed out of service because of technical problems. Computers can also be arranged to monitor themselves continuously, checking for problems, and reporting any problems developed in essentially the same manner described above whereby users report problems, but this process can be fully automated.

Still, the task of diagnosing the problems in a computer that is malfunctioning remains a difficult and time-consuming one, one that requires considerable ingenuity, and one that also requires considerable experience on the part of service personnel. When faced with a problem the solution to which is not obvious, service personnel frequently guess at possible causes and then try various fixes, continuing this process until a problem finally disappears. This may take a long time and may involve replacing hardware components or re-installing software components or installing software patches that were not actually needed, wasting both time and materials.

What is desired, for example, is some way to enable service personnel to take advantage of the expertise represented by the hundreds and thousands of computers that are operating in the field and that are properly configured, as is indicated by their generally acceptable performance. For example, if a first machine is malfunctioning and a second machine of the same type, having more or less the same system configuration, and performing the same business function in a similar industry is available to serve as a properly functioning model, then the configurations of the two machines, as well as their comparative performance, could be compared. Any differences between them would suggest possible causes of the malfunction. But comparing two machines in this manner is not without its risks, for any given machine might possibly be mis-configured even though it appears to be fully operative. And it is difficult to find a comparably configured computer to be used for comparative purposes. Accordingly, the present invention proposes new methods and systems for determining whether a computer is properly configured and performing normally.

SUMMARY OF THE INVENTION

Briefly described, an embodiment of the present invention comprises a method for identifying clusters of similarly-configured computers. This method comprises gathering system and business configuration information values from a set of computers. Next, at least a portion of the system and business configuration information values gathered from the set of computers is analyzed along with the numbers of computers that are configured in various ways. Then, using the result of the analysis as a guide, logical expressions of configuration information values are selected for use as definitions of one or more clusters of similarly-configured computers, the selection process generally maximizing the number of computers included within each cluster and also generally maximizing the number of configuration information value specifications included within the definition of each cluster. Then, for one or more clusters so defined and selected, one or more statistics or limit values or both are generated from one or more configuration information values gathered from the subset of computers included in the one or more clusters.

Another embodiment of the invention is a system for identifying from a set of computers clusters of similarly-configured computers. This system comprises a data gathering system connecting to the set of computers arranged to gather system and business configuration information values from the computers in the set, and a clustering routine that can analyze at least a portion of the gathered system and business configuration information values as well as determine how many computers are configured in a given way. The clustering routine uses the results of such an analysis to guide in the selection of logical expressions of configuration information values for use as definitions of one or more clusters of similarly-configured computers, the selection process generally maximizing the number of computers included within each cluster and also generally maximizing the number of configuration information value specifications included within the definition of each cluster. A cluster parameter routine then generates one or more information values representing statistics or limit values or both and corresponding to at least some of the configuration information values gathered from the subset of computers included in each cluster.

DETAILED DESCRIPTION OF THE EMBODIMENTS DEFINITION OF TERMS

Figure 1:
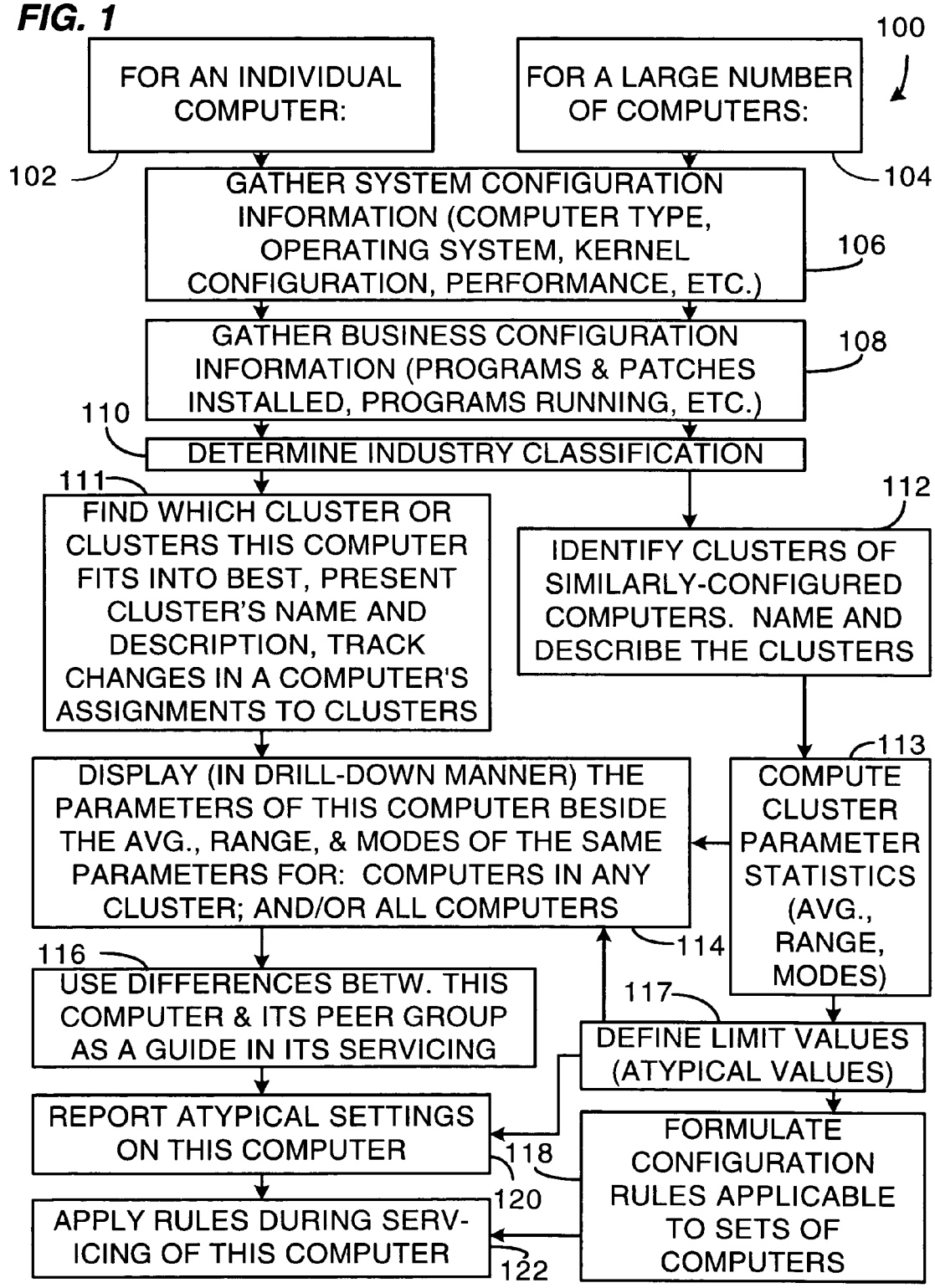
FIG. 1 presents a flow chart of oparations performed by an embodiment of a method for gathering configuration information values from computers, defining clusters or peer groups of similar computers, and then using differences between individual computers and peer groups to aid in diagnosis, maintenance, and repair.

The following terms used in this application shall have the respective meanings ascribed to them below unless otherwise expressly defined in this application.

ENTERPRISE. An enterprise is a collection of computers, software, and networking that normally and typically interconnects the computing environment of an entity or organization of people (for example, a corporation, or division, or site, or entity defined by the extent of a WAN or LAN).

NODE. A node is a monitored device—a particular device in an enterprise, other than information pathways, to which or from which or through which information may flow over an enterprise network. Nodes normally have a network address, and some may also have names. Examples of nodes are computers that can be monitored (servers, work stations, PCs, and other types of computers), printers, and interconnect devices that can be monitored (routers, switches, hubs, etc.). (A multi-processor may be considered a single node or multiple nodes.)

COMPUTER. Unless the context indicates otherwise, throughout this description the term computer means computer or other node. A computer may be, for example, a server, a workstation, or a PC.

ELEMENT. An element is one or more physical devices (CPUs, computers, hardware, storage systems, etc.) or logical devices (software, firmware, volumes, directories, files, databases, threads, processes, functions, etc.) within an enterprise that can be monitored and/or managed.

CONFIGURATION INFORMATION. Configuration information is any information specific to the static or dynamic configuration of one or more elements or classes of elements residing on one or more computers at a given point in time or over a range of time. Also included (for example) are such things as kernel configuration parameters, registry parameters, installed software, installed patches to software, measured performance, and software (or processes) actually running. Configuration information values are specific values for individual items of configuration information.

SYSTEM CONFIGURATION INFORMATION. The technical configuration of a computer without regard to its particular business application, including (for example) the specific type of computer, the operating system software and version, the system utilities software installed, the software patches installed relating to the operating system and system utilities, its kernel configuration parameters, the ROM-BIOS version, the type of processor, the type of peripheral equipment attached, measurements of general performance, etc.

BUSINESS CONFIGURATION INFORMATION. The business configuration of a computer (without regard to the type of computer, the operating system installed, and other such system configuration details), includes (for example) the specific business application software installed (and possibly also the specific business application peripherals installed, if any), the patches installed for the specific business application software, actual usage data on what business application software is actually run or exercised on a given computer and how often it is run, etc., and the industry or business classification of a computer.

COLLECTOR. A collector is software in the form of a program or script file (containing a command or a series of commands) that accesses, or that cause one or more other programs or script files to access, a computer (or computers) to gather configuration information about the computer (or computers) and its (or their) elements and then to return this information to a remote or central site for further analysis.

CONFIGURATION TRACKER. A configuration tracker is a system which causes collectors to gather configuration information from one or more computers over time and which may present snapshots of information, or averaged information, or typical information for a computer and which, in some cases, may also highlight changes between snapshots of this information gathered at different times.

TRACKER DATABASE. A tracker database or data set, or a repository database or data set, is a database containing configuration information gathered by collectors, and in the present context both system- and business-related configuration information defining the configuration of computers and elements, gathered from one or more computers of one or more enterprises and thereby facilitating evaluation or analysis, comparison, clustering, and report generation. A specific tracker database may be provided and so named (see the tracker database 214 in FIG. 8 within the HAO server 212), but some configuration information may be stored in other databases (such as the SQL DB 526 in FIG. 11 within the analyst server 522).

ANALYZER. An analyzer is a software program or rule or other set of instructions defining how configuration information gathered from a computer is to be analyzed to develop information for later use in reports and in comparative studies and the like. An analyzer or rule can require that one or more desired or mandated configuration information value settings be maintained if one or more other configuration information value settings on a given computer or other node are in designated states. Such a rule can be used to detect and report when the configuration information value settings of a computer fall outside the requirements of a rule.

CONFIGURATION RULES. Rules induced following the study of the computers assigned to a cluster or peer group that indicate how a typical computer assigned to a cluster or peer group is normally configured, and which (for example) may be developed as analyzers for use in identifying potential issues (defined below) relating to specific computers during periodic monitoring or during diagnosis, maintenance, and repair.

ISSUES. Issues are conditions or configurations and also data that, following analysis, may need to be reported to and may then need to be addressed by management. For example, the fact that a particular computer's configuration departs significantly from the configuration of other computers assigned to the same cluster is an issue that may require management to investigate and possibly reconfigure the computer.

PEER GROUP. The relevant peer group of a computer can be defined in several different ways: For example, it can be a cluster of computers configured in a similar manner, considering both systems and business configuration information; or it can be a cluster of computers similarly configured as just described and also all residing within businesses (or other enterprises) assigned to the same (or to a similar) industry or business classification (health, education, military, etc.).

INDUSTRY OR BUSINESS CLASSIFICATION. The industry or business classification of a computer is that of the business or other enterprise that owns and operates the computer. Business or enterprise classifications may, for example, be determined by reference to nationally or internationally standardized categorizations of businesses, such as (for example) the North American Industry Classification System (NAICS). (This material was developed in 1997 by the Office of Management and Budget and the U.S. Census Bureau, and it was compiled into a handbook by Cremeans (ISBN # 0890590974)). Other non-standardized industry or business classification schemes may also be used for this purpose.

Introduction

The embodiments described below center upon the general principle that the maintenance and servicing of large numbers of computers and the like can be simplified and speeded up if the computers are first divided up into meaningful peer groups or clusters of similarly configured computers. The computers assigned each such cluster may be chosen such that they share basic system properties, such as the hardware model and operating system, as well as basic business properties, such as the application software installed and/or in actual use. Finer grained clustering may further cluster together computers that share similar configuration settings in other respects. The best quality and most meaningful cluster definitions may then be selected, and statistics about the configuration of the computers assigned to each cluster may be computed. Guided by these statistics, and also optionally calling upon the expertise of those skilled in computer maintenance and servicing, limit values for various items of configuration information of the computers assigned to each cluster may also be defined.

Figure 2:
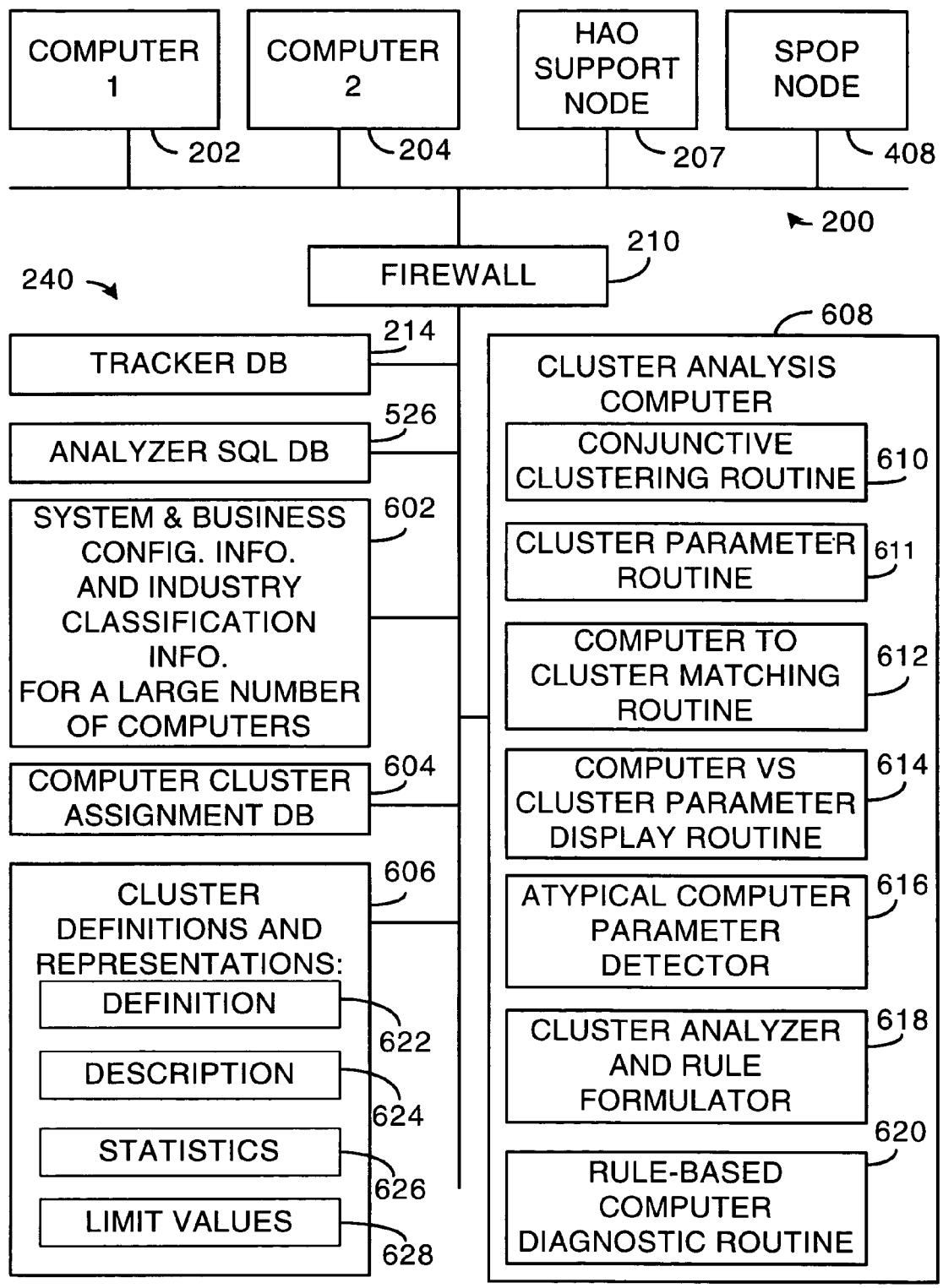
FIG. 2 presents a block diagram illustrating the structural components of an embodiment of the invention, including computers and support nodes located at enterprise sites and also including databases and routines located at a central site.

Referring to FIG. 2, a cluster definitions and representations database (or set of data) 606 may be established. In addition to including a definition 622 and description 624 of each cluster, such a database 606 would contain one or more representations of configuration information that an idealized computer included in that cluster would have. The representations can include, for example, statistics 626 computed from many computers qualifying as cluster members concerning the variability of various items of their configuration information. The definitions and representations data base 606 can include, as another example, limit values 628 for some configuration information, defining atypical configurations that may be sources of trouble. The representations can include the formal definitions 622 of the clusters—conjunctive, relaxed conjunctive or even more general logical (AND, OR, NOT, etc.) expressions defining a pattern of, possibly, business or system configuration information values or both that a computer is required to have to qualify as a cluster member during the development of cluster statistics and the like. And in addition to such logical cluster definitions 622, carving out a defined set of computers, the representations of a cluster may also include one or more desired or required meaningful configuration settings expressed as limit values 628, again stated logically, such clusters thus functioning in essence as a set of logical rules specifying configuration norms as limit values 628.

During maintenance and servicing, the configuration parameters of individual computers may be compared to the cluster statistics 626 (statistical information values such as averages, ranges, and modes of the configuration information values found on a peer group cluster or other clusters) and to cluster limit values 628 (such as ranges of acceptable values, lists of acceptable modes for discrete values, and defined atypical values), and departures from the statistics (or norms) 626 or from the limit values 628 may be singled out for attention. A "drill-down"-style display tool may be used by service personnel and also by others to compare and to contrast the specific configuration settings of any given computer to the statistics 626 and the limit values 628 of that computer's peer group cluster or to those of any other cluster or to those statistics derived from a global set of all the computers in all the clusters, highlighting the extent to which the configuration settings of a given computer depart from the norms defined by the statistical evaluation of each cluster and possibly by the further establishment of limit values. More focused rules may also be defined that focus upon selected sets of computers configured in particular ways and that differentiate typical, normal, and acceptable configuration information values from atypical and possibly suspect values.

All of this is explained in the first section of the description that follows. A middle section of this description describes specific approaches to the determination of meaningful clusters through conjunctive clustering and relaxed conjunctive clustering. A final section of this description describes different ways in which configuration data may be gathered in an automated fashion from large numbers of computers in support of both clustering and also investigating the configuration settings of individual computers.

Defining Peer Group Clusters

FIG. 1 presents a flow diagram of a series of method steps 100 that form an embodiment of the present invention. FIG. 2 presents a block diagram of the system components that participate in carrying out these method steps. The paragraphs which follow contain references to both of these two figures.

As is shown at the right side of FIG. 2, the system includes a number of routines 610 to 620 which may be installed on different computers but which are illustrated as sharing a cluster analysis computer 608 located at a central site 240. The system also includes a number of databases. These are shown located at the same central site 240, although the system components need not be located all at the same site. Through a firewall 210, these system elements are interconnected by networking, typically including LANs, WANs, intranets and the Internet or the like, to a large number of remote computers 202 and 204 only two of which are shown for illustrative purposes located at an enterprise site 200. Of course, there could and typically would be any number of enterprise sites and computers. The computers may be servers, workstations, PCs, or other nodes such as network interconnect devices (routers, hubs, bridges, etc.) or other addressable system components such as printers, communication devices, and the like.

Also shown situated at the enterprise site are remote servers provided for data gathering and maintenance and support purposes, in this case an HAO support node 207 and an SPOP node 408. The use of HAO or SPOP nodes to gather data is illustrative, rather than essential. For example, special software installed on the computers 202 and 204 can be used to gather data instead. Through use of these remote support nodes or data gathering software installed on the remote computers, the tracker database 214, and other equipment illustrated more completely in FIG. 8, FIG. 9, FIG. 10, and FIG. 11, configuration information may be gathered, both routinely and also at special request, from any and all of the computers 202 and 204 of the enterprise site 200. In the discussion which follows, this information is presumed to be present and available within a tracker database 214 where it may be accessed and processed by the routines installed on the cluster analysis computer 608.

Consider next the steps 104, 106, 108, 110, 112 and 113 shown in FIG. 1. These steps analyze the computer configuration information which the tracker database 214 contains and determine meaningful clusters of the computers, as will be explained next. These steps conduct a detailed study of the configurations of many different computers 202 and 204 (step 104 and the following steps), gathering configuration information from them and also possibly performing performance tests upon them as well as tests of which software actually runs upon them, as contrasted to which software is installed but used infrequently or not at all on a given computer.

System configuration information (step 106), business configuration information (step 108), and optionally industry classification information (step 110) are gathered and studied. Most of this information can be found in the tracker database 214 or the analyst SQL database 526 and may have been gathered during routine maintenance operations. The industry classification information may be manually assigned to individual computers, or it may be manually assigned to all the computers within a given enterprise, depending upon its nature. In some cases, live tests may be conducted to determine which software actually runs on a given computer and to measure performance. The test results may also be placed into the tracker database 214. This information may be retrieved from the tracker database 214 or the analyst SQL database 526, formatted in a uniform manner (if that is necessary), and then stored together within a database 602, organized such that each information value may be associated with a descriptive identifier of the type of configuration information, the element or class of element that each item of configuration information relates to, and the identity of the computer from which the information came as well as the identity of the enterprise which contains that computer.

At step 112 (FIG. 1), the information stored in the database 602 may next be processed by a conjunctive clustering routine 610 which, at step 112 (FIG. 1 and FIG. 6), identifies and defines meaningful clusters of similarly configured computers.

The clustering process, briefly summarized, involves first selecting the system and business configuration elements that are to be used in determining into which cluster or peer group each computer falls. Parameters that rarely vary from one computer to the next, and also parameters that have too much variability, are normally not selected, since they are not useful for meaningful clustering. Likewise, sets of parameters that vary uniformly from one computer to the next are considered to be just a single parameter. Some parameters may not be helpful in defining meaningful clusters.

Next, a rough cut at clustering can be taken by grouping together, for example, all the machines of the same model and all the machines having the same operating system version, since in many cases it would not be meaningful to cluster together machines of different types or machines equipped with differing operating systems. As a further step, computers running particular business application software might be formed into a cluster as well.

Further clustering steps can be automatically performed through an analysis process which may be called conjunctive clustering (or relaxed conjunctive clustering) which is explained more fully below and in FIG. 3, FIG. 4, FIG. 5, and FIG. 6. The routine 610 thus identifies and selects clusters, or peer groups, of similarly-configured computers.

To save on time and the number of computations required, a random sampling algorithm may be used to sample a statistically significant number of the computers, rather than processing configuration data retrieved from every computer in every enterprise. The optimum clusters may be chosen in a fully automated fashion, as by choosing those cluster definitions that maximize both the number of shared configuration parameter values in the definition of a cluster of computers while also maximizing the number of computers assigned to each cluster as well, or it can be done manually or semi-manually, with human screening of the definitions of clusters preliminarily screened for quality in an automated fashion. The cluster definitions finally selected may be stored in the cluster definitions 622 portion of the cluster definitions and representations database 606.

Another possible role for a human supervisor of the clustering process is that of coming up with meaningful names and descriptions of the various clusters, which may be stored in the cluster description 624 portion of the cluster definitions and representations database 606. Alternatively, the cluster conjunctive definitions (for example, "Oracle-^SAP" and "Java^C++" shown as the names of cluster 1 and cluster 2 in FIG. 3) may be used as meaningful, descriptive names for each cluster, or as a cluster description, with these names generated in a fully automated fashion. These descriptions can automatically be assigned to all the computers assigned to each cluster to later aid service and maintenance personnel in identifying the role, and in particular the business use, that a particular computer requiring service or maintenance plays within a given enterprise. Also, a computer may be manually assigned to a particular cluster (and business use) based upon the name and description of the cluster, and then the process of determining whether the computer's configuration is appropriate to that assignment can later be determined in a fully automated fashion.

This clustering process may be repeated periodically so that the clustering and the assignments of computers to clusters can vary over time to reflect changes in the way the computers are configured and changes in how a given classification of computers can be identified and assigned to a cluster.

When the clustering process is completed, the assignments of individual computers to clusters (or to multiple clusters) may be determined (steps 102, 106, 108, 110, and 111) and recorded in a computer cluster assignment database 604 (FIG. 2). Even if a computer was included in the process of generating or defining the clusters, that given computer may still go through the separate process of being evaluated and then assigned to one or more clusters. And, of course, the configuration of any given computer is likely to change over time, so this process may be repeated periodically. Changes in the assignment of a computer to clusters may be recorded for each computer, since such changes are of interest to those managing the computers and may even signal a problem.

As new computers are added to the enterprises, and as is indicated in step 102, the individual computers may be individually subjected to the same data gathering steps 106, 108, and 110. Then, at step 111 (FIG. 1 and FIG. 7), the individual computers can then be assigned to pre-existing clusters or peer groups that most closely match their system configurations, business configurations, and industry classification (if any). A computer may be assigned to a matching cluster, or perhaps to several matching clusters, or to the cluster that proves to be the best match. This is done by a computer to cluster matching routine 612 (FIG. 2). In this manner, the clusters or peer groups can grow as new computers are added to the enterprises, and every computer is assigned to the peer group (or cluster) or peer groups (or clusters) that includes computers most closely matched to each computer's particular configuration, or that prove to be the best match to a given computer.

Using Peer Group Clusters to Aid in Maintenance and Service

Next, all (or many) of the configuration information values obtained from each computer assigned to each cluster (and not limited to the subset of information values that were actually used to define the clusters and to determine a computer's clustering assignment) may be retrieved from the database 602 or directly from the databases 214 or 526 (or from elsewhere) and then processed by a cluster parameter routine 611. This routine 611 computes configuration information statistics (step 113), including, for example, average values, ranges of values (where appropriate), standard deviations (where appropriate), or modes (normal discrete values, including "default" values, that large numbers of the computers in each cluster are found to have, as distinguished from atypical discrete values that only one or just few computers in each cluster are found to have). Similar configuration information value statistics may also be generated for all of the computers collectively (as opposed to separate statistics for each cluster or peer group). All of this statistical information can then be saved as statistical information values in a cluster statistics 626 portion of the database 606. The routine 611 may also be used to compute configuration information limit values (step 117) such as acceptable ranges for configuration information in a given cluster and also the designation of atypical values which are not desired or which are prohibited, or which management has decided are not to be used for some reason.

To save on computation time, these statistical and limit value computations can be done upon configuration information relating to a random sampling of the computers within each cluster, rather than upon configuration information relating to all the computers within a given cluster.

The cluster statistics 626 and limit values 628 can then provide, for example, average values, normal ranges of values, standard deviation values, modal values, and other such statistical values corresponding to each of the many configuration information values that are gathered from each computer, as well as limit values for those gathered values. Accordingly, the value of a given configuration parameter obtained from any given computer may be compared to the statistics 626 for any given cluster, including one or more of the peer group clusters for that particular computer and also including a global cluster that is defined to contain all of the computers taken together, whenever this would be desirable or helpful during service and maintenance. And the value of a given configuration parameter may also be compared to limit values, possibly in an automated fashion such that reports of out-of-limit configurations can be generated fully automatically.

A computer versus cluster parameter display routine 614 is provided, and its functioning is described in step 114 of FIG. 1. By displaying differences between a computer and its peer group, this routine can be used as a guide in servicing the computers (step 116 of FIG. 1). A service technician or other individual interested in viewing one or more of the configuration information values assigned to the elements of any computer begins by first selecting a computer by name from a list or other selection mechanism. Next, using a conventional computer window "drill-down" display mechanism (see, for example the similar "drill-down" display window 412 also used to display configuration information values which appears in FIG. 4 of U.S. Pat. No. 6,282,175 cited in the first paragraph of this application), and by clicking on the +signs and − signs to the left of the outline headings and subheadings within the drill-down display window to expand and to contract its outline structure, the technician selects specific elements and then displays their configuration information values. For example, a technician might drill all the way down to the value "−free space=2.0%" under the element name "+drive C:" under the subheading "+Hard Drives" under the main heading "+Storage devices" to display how much free space remains on that internal disk drive.

If the technician desires, he or she selects a display feature such as "display statistics," and then the display line expands and reads (for example): "−free space=2% Peer Group Avg. 30% Normal range 10% to 90%" The technician can then compare the free space on this given computer's hard drive to that of typical computers within the given computer's peer group. The technician may also select, from a separate menu of cluster names and descriptions, any desired cluster name and then view how the configuration information values found on this computer compare to the statistical configuration information values for any desired cluster. As a final option, the technician may also select to have displayed on the same line the global configuration information value statistics for all the computers in all of the clusters.

The statistical information values displayed will vary in accordance with the nature of the configuration information values and their manner of variability. In the case of a configuration information value that has a wide range of variability, the configuration information value of a particular computer can be displayed alongside an average value and a range of acceptable values or a standard deviation range. In the case of a discrete numeric kernel value or the like that, for example, defaults to the value 4 but that is frequently set to the alternate values "1" or "6" on many peer group computers, the mode (or modal) values "1, 4, 6" could be displayed, indicating that other discrete values may be abnormal.

Optionally, the same information may be displayed and printed in the form of a histogram or other plotted chart or graph. In such a histogram, the acceptable values, or the range of values, may be indicated by the height and placement of a vertical bar with respect to a baseline for each selected configuration information value, and the actual value for a given computer may be marked by a bar in a different color or shaded differently.

The values of each parameter for each computer within each cluster may be conveniently maintained within and retrieved from the database 602, and these parameter values may be periodically updated by collectors 208 (FIG. 8), as will be explained. Alternatively, the configuration information for each computer may be retrieved directly from the databases 214 and 526, or some or all of the information relating to a given computer and a given set of configuration parameters may be gathered directly from the computers as needed.

The outline view provided by the display routine 614 may be expanded or collapsed by mouse clicks on plus or minus signs to display the values of as many or as few of the parameters for a given computer as is necessary or desirable. Thus, the user, technician, or manager is presented with a view of as many of a computer's configuration and performance parameters as is desired, presented side-by-side with the average and range of variation for that same parameter within the relevant cluster or peer group. Colors may be used, even with collapsed outline entries, to signal the presence of atypical values that might warrant investigation (this is also discussed below). And as an added useful feature, the percentage of atypical values in comparison to the total number of configuration information values or some other similar index may be computed, displayed, and then used by maintenance and service personnel as well as others to signal generally to what degree the configuration of a given computer varies from that of any specified cluster. The view may be printed and utilized in other ways as well.

This display routine 614 has many uses. When it comes to diagnosing a problem, this display routine suggests which configuration and performance parameters are not set to normal values for the computer's peer group, and this can suggest places to look for causes of the problem. Service personnel can come to recognize certain patterns of parameter variation as indicative of the possible occurrence of specific problems. Thus, a computer that lacks a particular software patch which most of the computers in the associated cluster do have installed and that evidences malfunction of the patched program, is a candidate for installation of that patch. Contrariwise, if most of the computers in a given cluster lack a particular new patch for particular software, then a computer which has that patch installed and upon which that particular software is malfunctioning is a possible candidate for removal of that patch, since the new patch may be defective. Likewise, some software installed on a computer experiencing performance difficulties and not installed on most other computers assigned to the same cluster may be having its performance adversely affected by the presence of that particular software. Many other such examples will come to mind of the usefulness of this display routine to maintenance and to service.

Defining Acceptable Ranges of Values and Atypical Values

Another useful tool is illustrated at steps 117 and 120 in FIG. 1 and is represented in FIG. 2 as an atypical computer parameter detector 616. It has already been explained that statistics can be gathered that give a general indication of when a configuration parameter may have a value that is out of line with values found in the majority of computers configured in a particular way. This information can be screened, and actual limits can be designated for the configuration information values for computers within each cluster (step 117). These limits can be chosen in an automated fashion, but human intervention in this process is desirable to make sure that the limits chosen are reasonable limits. The limit values 628 then are stored along with the statistics 626 for each cluster, and they may then be used, for example, as guides to the display routine 614 as to when colors should be added to displayed values to signal the values are atypical, as was described above.

Figure 10:
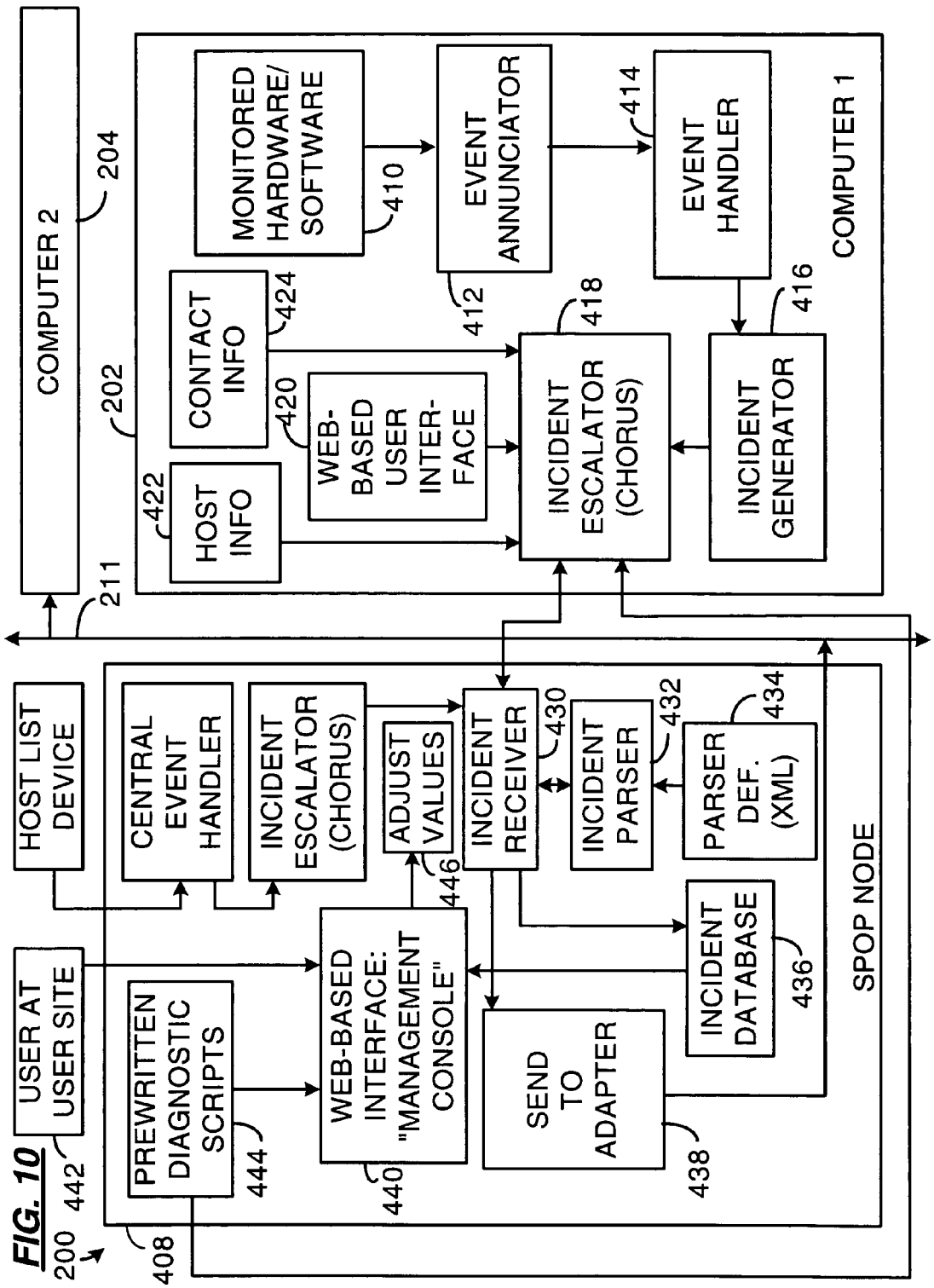
FIG. 10 presents a block diagram of an embodiment of an enterprise having an s-pop node arranged to gather configuration information values and other information using the chorus system.

Periodically (step 120), the parameters on each computer can then also be measured and checked against the corresponding limit values 628 retrieved from the cluster definitions and representations database 606. Parameters having atypical settings can then be automatically detected and logged for possible adjustment or servicing, particularly in the case where these values are found also to have changed over time. Reports suitable for presentation to users may automatically be generated setting forth the status of each machine, reporting exceptional parameters, and making specific recommendations. In an embodiment of the invention, this can be done by especially-designed analyzers kept in the analyzer database 220 (FIG. 8) described more fully below, and reports of atypical settings can be generated automatically by the report generator server 226. The way in which specialized user reports may then be generated is explained more fully in U.S. Application Publication No. U.S. 2002/0169738, published Nov. 14, 2002 (see, in particular, the description of elements 108, 112, 114, 116, 117, and 118 in that published application). Alternatively, annunciation of atypical settings may be triggered by the event annunciator 412, event handler 414, and incident generator 416 (FIG. 10). A further explanation of how such client reports may be automatically generated is presented in U.S. application Ser. No. 10/225,789 filed on Aug. 2, 2002, and in particular the description of FIG. 5 of that application.

Formulation of Rules Reflecting Configuration Norms

Figure 8:
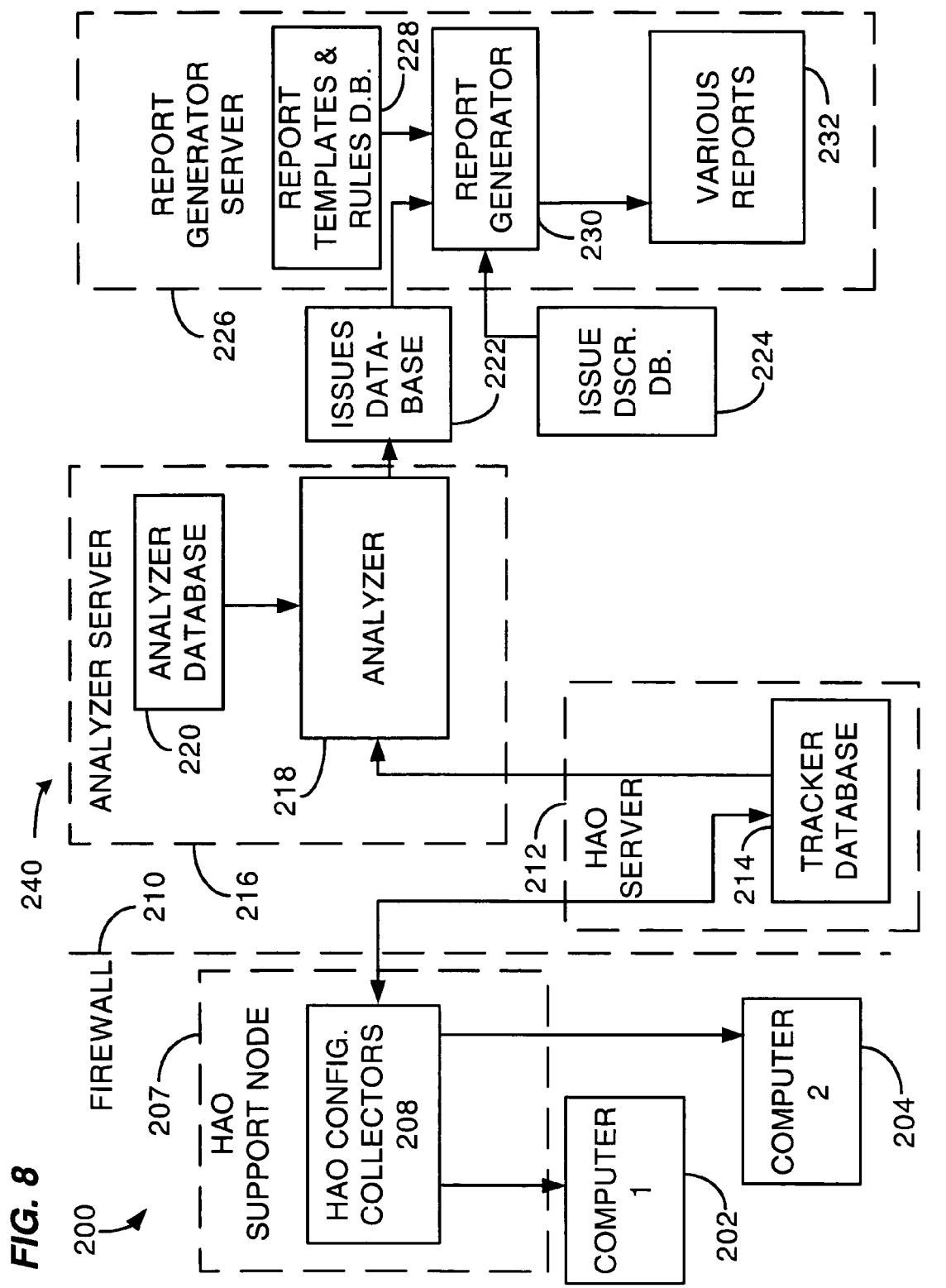
FIG. 8 presents a block diagram of an embodiment of an enterprise and a central site, the enterprise having a high availability observatory node that is used to gather configuration information values for storage, analysis, and report generation at the central site.

Once a stable set of parameters for the computers within a given cluster or peer group have been determined, and once ranges of acceptable values have also been determined and distinguished from exceptional values as just described, it is then possible to go back through and do a more precise job of formulating something more than just descriptive conjunctive clustering guidelines. One can formulate prescriptive rules of behavior for the computers that fall into a given conjunctively or logically defined subset or cluster—rules defining desired or mandated properties which certain groups of computers are required to have. Starting with the cluster definitions as a first cut as a trial scope of applicability and also starting with the ranges of acceptable values as a first cut at a mandated configuration command, one may begin the process of formulating actual rules (step 118) which, typically with additional human input and adjustment, can be formalized possibly as analyzers (computer programs), and then saved, possibly in an analyzer database 220 (FIG. 8). This is done with the assistance of a cluster analyzer and rule formulator 618 shown in FIG. 2. In a semi-manual fashion, the cluster analyzer and rule formulator 618 may also be used to alter the definitions of clusters to improve their performance and ability to distinguish related sets of computers from other computers, possibly adding NOT and OR logic to the AND logic utilized in automated conjunctive clustering as described below. Once formulated, the rules may be applied during the servicing of computers (step 122 in FIG. 1).

Each such rule needs to have a defined scope of applicability (unless, of course, it is applicable to all configurations). For example, a given rule may be applicable to all the computers in a given cluster or peer group, or all the computers within several different but related cluster or peer groups, or to all the computers configured in a particular way without regard to peer group assignments. A given rule may only be applicable to those computers having certain cluster values, as defined by some form or "IF . . . THEN . . . " formulation within the rule. These rules may be encoded to specify, for example, that when certain parameters fall within certain ranges, certain other parameters will normally have other values or other ranges of permitted values. These rules may thus define reference configuration settings or reference ranges for observed variables and may signal deviations from norms.

As a simple example, here is a simple rule: "IF a computer is an HP S800 computer, AND the computer is located in Canada, AND software packages X and Y and Z are installed upon the computer; THEN the kernel parameter K should be set between the values v1 and v2." Or, expressed more formally:

[server class=*HP S800*][location=*Canada*][runs *X*][runs *Y*][runs *Z*]→[v1<=k<=v2]

These rules can be applied by means of an interpretive processor operating as a rule-based computer diagnostic routine 620 to gathered data (which may be retrieved from the tracker database 214 or from the analyst SQL database 526). Alternatively, the rules generated by the rule formulator 618 can be implemented as analyzers that are placed into an analyzer database 220, and then they may be implemented periodically and automatically (or manually at the request of a system auditor) by an analyzer 218 (FIG. 8), as will be described. The analysis of such a rule may then give rise to issues which can be stored in an issues database 222 (FIG. 8) and which then may be used as the basis for generating both technical and non-technical reports 232. Typically, a violation of one of these rules will cause a computer to be scheduled for maintenance and possibly for repair, or the computer may be listed in some form of exception report.

In other embodiments, the rules may be integrated into an incident generator 416 (FIG. 10) as criteria for whether an event should be escalated by an incident escalator 418 and brought to the attention of service personnel at a central site, as will be explained at a later point.

The rules may be generated automatically, or they may be generated by a domain expert with the aid of the various software tools shown on the cluster analysis computer 608 and described above. Or rules may be generated semi-manually, with domain expert input into the process. After a set of rules have been formulated, new rules may be added, rules may be removed, and new categories of machines may be added to a given rule's scope of applicability. Each rule preferably has associated with it a criterion that determines the relevance of the associated reference setting to a given computer. Thus, some rules may relate to only some of the computers within a given cluster, while other rules may apply across computers assigned to multiple clusters and having some common characteristic or set of configuration information values. There can be human generated comments associated with a given rule suggesting, as a value judgment, that it be applied to certain usages or certain users.

The usefulness of such a rule, and whether it needs to be updated or discarded, can be determined by measuring how many computers within a rule's scope of applicability comply with the reference setting defined by the rule and by then carrying out, for example, performance measurements on computers that do and that do not comply with the reference setting defined by the rule. Also, the number of support calls directed to machines having and not having a given reference setting can be compared as a measurement of a rule's effectiveness as a practical tool.

Such rules may include two parts: a set of desired or mandated configuration information settings and a definition of which computers these settings are applicable to. Given a set of such rules, an analyzer and report generator (described below) or an equivalent mechanism can be arranged to identify as issues instances where the configuration information settings of a computer to which such an analyzer or rule is applicable are not in accord with these settings, and can generate one or more reports explaining such departures. And if the representations of such a rule further include statistics 626 defining such things as what percentage of computers to which such a rule is applicable comply with the desired settings, then this information can be included in such a report as well.

Selecting Optimal Clusters

U.S. application Ser. No. 10/448,899, cited in the first paragraph of this specification, contains a full description of a specific method and system for finding optimal conjunctive clusters in a fully automated fashion. The specification and drawings of the Mishra application are incorporated by reference into the present application for all purposes, and accordingly, all of its detailed description will not be replicated here. The following paragraphs present an explanation of conjunctive clustering (also of relaxed conjunctive clustering) and its use in an embodiment of the present invention, for example in the steps 111 and 112 (FIG. 1, FIG. 6, and FIG. 7) and in the routines 610 and 612 (FIG. 2), first to classify computers into groups or clusters and then to match a new computer to a matching existing cluster.

Figure 3:
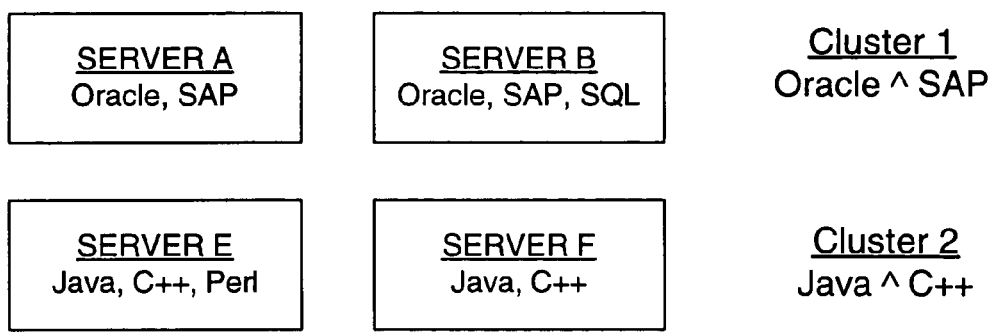
FIG. 3 presents a block diagram of four servers, indicating what software components they contain, and illustrating two conjunctive clustering arrangements of the four servers clustered by how they are configured.
Figure 4:
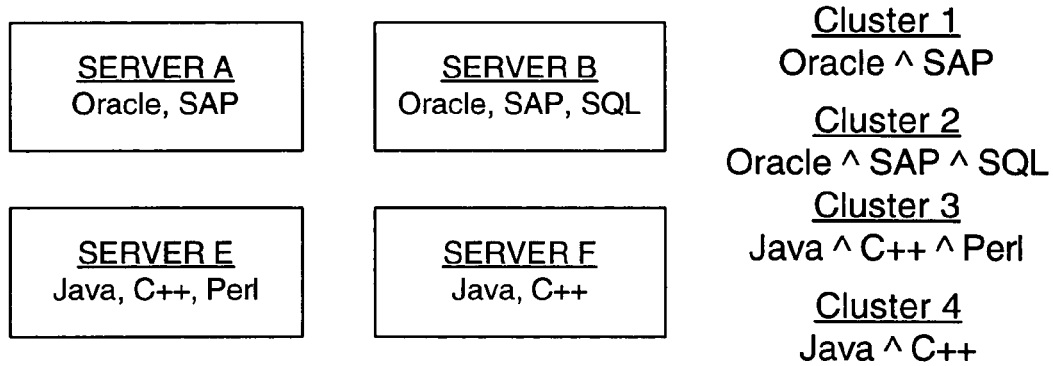
FIG. 4 presents a block diagram of the same four servers shown in FIG. 3, and illustrating four additional conjunctive clustering arrangements of the four servers.
Figure 5:
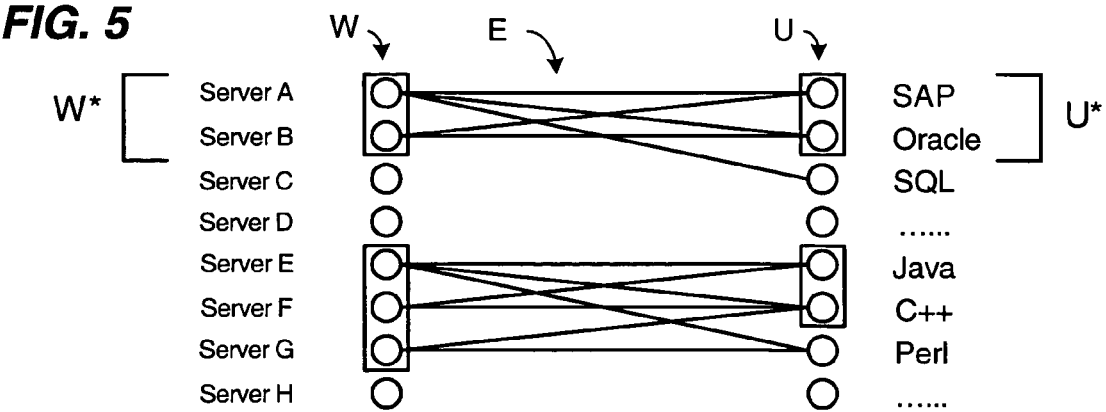
FIG. 5 presents a bipartite graph of the servers, software, and conjunctive clusters shown in FIG. 3 (plus additional servers and software); the servers shown as "points" W, the software shown as "attributes" U, and the clusters shown as "edges" E interconnecting points and attributes; with boxes defining the subsets W* and U* to represent the cluster 1 in FIG. 3.

FIG. 3, FIG. 4, and FIG. 5 each show four servers labeled respectively server A, server B, server E, and server F (FIG. 5 shows additional servers as well). While a typical server contains many different system and business configuration parameters, for the sake of simplicity in the discussion which follows, the only configuration parameters shown in FIG. 3, FIG. 4, and FIG. 5 are which software is installed on these servers, and the list of software shown for illustrative purposes has been kept very short. The four servers are shown each containing differing sets of software. The servers A and B contain business and database software. Both of the servers A and B contain the software programs Oracle and SAP; and in addition, the server B also contains Microsoft's SQL Server software program. The servers E and F contain software development programs (or software). Both of the servers E and F contain the software development programs Java and C++, and the server E additionally contains the software development program Perl.

In this discussion, the specific exemplary program names used such as Oracle, SAP, and SQL Server were selected for purposes of illustration, and clearly many other applications could have been chosen instead. Also, such applications often include many possible processes, sub-processes, components, configurations, and other variations, and they may possibly be distributed over multiple devices or platforms, rather than existing as single executable files on a single machine. The presence or absence of an application may be determined by the detection of the presence or absence of one or more sub-processes or other component of that application.

In FIG. 3, the four servers are shown broken into two clusters, cluster 1 and cluster 2. Each of these clusters is defined in terms of a requirement that the servers grouped within each cluster have certain software installed. As can be seen in the cluster 1 definition and in the cluster 2 definition, the definition of a cluster is simply a list of properties conjoined by the symbol "^" which means "AND" and which signifies "conjunction" or "AND"ing together. Each property is a property that a server may have or may not have. In this simple example, each property is whether or not the server has particular software installed upon itself. In general, each property can be whether or not the server is configured in a particular way, considering both business and system configuration parameters.

A first cluster 1 requires that all of the servers falling within the cluster 1 have installed upon themselves two business and database software programs—Oracle AND SAP. The "AND" here is capitalized to signify that this is an application of conjunctive logic, or ANDing. Each server that is a member of the cluster 1 must have the Oracle software program AND the SAP software program installed upon itself. If a server has Oracle installed upon itself but not SAP, or if it has SAP installed upon itself but not Oracle, then that server is not included in the cluster 1. (In later examples, this absolute requirement will be softened, as will be explained.)

A second cluster 2 in FIG. 3 requires that all of the servers falling within the cluster 2 have installed upon themselves the two software development programs Java and C++.

With these two clusters 1 and 2 thus defined, a large group of servers can be broken into three clusters: those for business and database use, which fall into cluster 1, and those for software development use, which fall into cluster 2, and all others.

It is also possible that the criteria for defining a cluster can be more complex than this and might, for example, include disjunctive logic or "OR" logic. Thus, servers might be placed into a cluster only if they contained a first software program AND also either a second software program OR a third software program OR a fourth software program. More generally, NOT logic might also be used in defining a cluster. In one embodiment of the invention, it is contemplated that conjunctive clustering is done in a fully automated way, while the cluster definitions may later be refined through human intervention to contain OR and/or NOT logic to form rules which classify computers more precisely into meaningful clusters. When one is confronted with many different computer business and system configuration parameters from which to choose when defining clusters in a fully automated fashion, it is simplest to use conjunctive clustering initially. In a later stage, clusters may be refined by formulating their definitions as more precise logical rules, as is indicated in step 118 of FIG. 1. These more complex logical statements defining clusters are normally developed with human assistance.

FIG. 4 illustrates what happens when each differing combination of configurations found on each different server is used to define a different unique cluster. When FIG. 4 is compared to FIG. 3, it can be seen that the clustering in FIG. 3 divides the four computers generally into two large clusters, while the clustering in FIG. 4 assigns each computer to four clusters, with the clusters 1 and 4 also containing the computers assigned to the clusters 2 and 3. As can be seen, the two new clusters shown in FIG. 4 contain only one server each. This is not as useful for computer maintenance and support purposes as a less selective approach to defining clusters, such as that illustrated in FIG. 3.

The clustering illustrated in FIG. 3 is more useful and practical than that illustrated in FIG. 4 because some of the clusters shown in FIG. 4 contain too few servers to be useful. At the other extreme, if each cluster specified only one configuration parameter, then there would be too many overlapping clusters, and the clusters would again not be useful because of this overlap and because the computers assigned to each cluster would not share enough matching configuration characteristics to be useful in maintenance and support applications.

Accordingly, and in general, longer conjunctive cluster definitions (those that contain more server configuration parameters conjoined together) tend to be more useful than shorter conjunctive cluster definitions. But when a conjunctive cluster definition becomes so long that the clusters it defines contain very few servers, then the cluster definitions also become less useful. Combining these two general principles, a "cluster quality" measurement may be formulated as follows: The quality of a given cluster may be determined by multiplying the number of parameters that are ANDed together to form the cluster's definition by the number of servers that the cluster so defined contains.

Alternative quality measures may be defined as well that generally tend to favor longer cluster definitions and larger clusters.

FIG. 5 presents the above information in a more formal manner. FIG. 5 presents what is called a "bipartite graph" of the servers, the software programs installed (or actually used), and the cluster definitions which are shown in FIG. 3. The servers A through H are shown as a set of "points" W, and the software programs SAP, Oracle, etc. and also other software programs are shown as a set of "attributes" U. In FIG. 5, lines or "edges" E are shown interconnecting the servers ("points") and the installed software programs ("attributes") to indicate which software is installed on which servers, or (expressed differently) which "attributes" each "point" has.

Consider the Cluster 1 definition shown in FIG. 3, which is "Oracle ˆ SAP" (or "Oracle AND SAP"). In FIG. 5, this definition of the cluster 1 is shown to be fully satisfied by the subset W* of the servers W which subset includes only the two servers A and B. Each of the servers A and B in the subset W* of the servers W is shown in FIG. 5 to be connected by means of lines (called "edges") to both of the installed software programs SAP and Oracle, a subset U* of all the installed software programs or attributes U. Thus, the cluster 1 includes the two servers A and B that form the subset W* of all the servers W and that have installed upon themselves all the software programs in the subset U* of all the software programs U.

With respect to FIG. 5, the quality of a given cluster, defined informally above, may now be defined somewhat more formally: The quality of a given cluster of servers, defined by a conjunctive definition of the cluster, is the product of the number of programs that are contained in the cluster's definition multiplied by the number of servers that are contained within the cluster so defined. More generally speaking, the quality of a "biclique" (a set of servers all of which satisfy a conjunctive cluster's definition) is the number of "attributes" (in this case programs, but more generally system and business configuration parameters) that are contained within the cluster's definition (the parameter values ANDed together to form the definition of a conjunctive cluster) multiplied by the number of "points" (in this case, servers or other computers) that each satisfy the cluster's definition.

This working definition of cluster quality provides a mathematical tool that can guide the fully automated formulation, testing, and selection of useful clusters of servers (or other computers). A computer can be supplied with a database containing, for each of numerous servers (or other computers), a list of each server's configuration parameters and their values. The computer can then generate numerous trial conjunctive cluster definitions. Then the computer can test out each cluster definition for its quality, as defined above. Those cluster definitions having the highest figure of quality, when measured in the context of a given set of servers (or other computers) each configured in a particular way, may then be selected for use in aiding in the maintenance and servicing of the servers (or other computers) assigned to each of the clusters so selected. At some point in this process, humans may also participate in the selection of the final set of clusters to ensure that the clusters are truly meaningful and reasonable and comprehensible to humans, as in step 118 in FIG. 1.

FIG. 5, more precisely described, presents a bipartite graph G=(U, W, E), where: W is a complete set of points each representing a server (or other computer); U is a complete set of attributes each representing a system or business configuration parameter; and E is a complete set of all the edges which interconnect the points and the attributes, representing the configuration parameters that each server (or other computer) has. Within this bipartite graph, FIG. 5 reveals that there exists a biclique (U*, W*) which includes the boxed set of points forming the subset W* representing the servers A and B, and which also includes the boxed set of attributes forming the set U* representing the software programs SAP and Oracle, and which further includes the four edges that interconnect these two points with these two attributes. This particular biclique corresponds to the cluster of the two servers A and B that satisfy the definition corresponding to the cluster 1 ("OracleˆSAP") shown in FIG. 3.

In the context of FIG. 5, the term "biclique" may be more precisely defined as follows. Given the bipartite graph G=(U, W, E); given W* is a subset of W; and given U* is a subset of U: then the set (U*, W*) is a "biclique" if there is an edge between each vortex in U* and each vortex in W*. One possible choice as the figure of quality of such a "biclique" is then the size of W* multiplied by the size of U*, or "|U*|∥W*|" which turns out to be precisely the number of "edges" that the biclique contains, in this case four edges.

Using this terminology, the problem of finding the conjunctive clusters of best quality for use in the maintenance and troubleshooting of servers (and other computers) may be formulated mathematically as follows: Given a bipartite graph G=(U, W, E), where the points W each represent a server (or other computer), where the attributes U each represent a possible configuration parameter of any of the servers (or other computers), and where the edges E each represent a configuration parameter (or attribute) that is assigned to a specific one of the servers (or other computers); then proceed as follows—by testing many sets of server (or other computer) clusters of the general form (U*,W*), where each W* is a subset of the total set of servers (or other computers) W, where each subset W* shares the same subset U* of the configuration parameter attributes U such that each (U*,W*) is a true biclique (this means the cluster is defined by a conjunctive cluster definition); find and retain only those clusters having, or coming close to having, the maximum number of edges of any of the many clusters tested. In other words, identify those bicliques or clusters that maximize the product |U*∥W*|.

It is also possible to provide additional control over the process of selecting cluster definitions, mandating some aspects of clustering. Thus, it can in many cases be useful to never cluster together different types of machines (from a hardware perspective), or machines having different installed operating systems, or both. It also can be useful to give more weight, during the process of evaluating the quality of clusters, to some configuration parameters than to others. For example, the type of computer and the operating system might be given greater weight during the evaluation of cluster definitions for quality than is given to other configuration parameters.

The step of determining whether a given computer falls within or without a given cluster, as defined above, can also be modified or relaxed to give what in many cases can prove to be more useful results. For example, the above definition of a biclique (or conjunctive cluster) required every one of the subset of points (servers or other computers) included within a given biclique (or cluster) to be linked by an edge to (or to be configured to have) every one of the subset of attributes (or configuration parameters) associated with that biclique. This definition of a biclique can be relaxed as follows so as to include more points: some of the points (or servers or other computers) may be permitted to be included in a biclique (or cluster) even though they are not linked by an edge to one, or perhaps two, or perhaps even more, of the subset of attributes (or configuration parameters) that are associated with the biclique. In other words, with reference to FIG. 3, we might permit a server to be included in the Cluster 1 if it has installed upon itself the Oracle program but not the SAP program. Of course, it is reasonable to require the servers (or other computers) assigned to a given cluster to be required to have certain properties, such as the hardware identification and operating system installed, while permitting them to lack one, or two, or perhaps more properties contained in the conjunctive cluster's definition. Such clusters may be defined as relaxed conjunctive clusters. And in the case of clusters whose definitions contain general logic (AND, OR, NOT, etc.), these may be called relaxed logical clusters.

As a possible example of this, and speaking more formally for the moment: Given a bipartite graph G=(U, W, E) that has a maximum edge biclique (U*, W*) computed as described above, the problem that one now faces may be formulated as that of finding several max edge relaxed bicliques that can be used to define useful relaxed conjunctive clusters for the purposes of maintenance and service. The problem is that of finding subsets (U', W') such that each subset:

(a) is close to being a biclique in the sense that the number of edges found in (U', W') is greater than or equal to (1—EPSILON) |U'||W'|; and (b) has almost as many edges as the maximum edge biclique (U*, W*), or the number of edges found in (U', W') is greater than or equal to (1–2 EPSILON) |U*||W*|.

In the above equations, EPSILON is a small value that may vary from application to application. And once again, certain edges, such as those associated with the installed operating system or those associated with industry category, can in any given case be made non-optional in order to control which configuration parameters may be missing on a computer assigned to any given relaxed cluster.

The above teachings explain how meaningful conjunctive clusters are defined and tested and selected, as in step 112 in FIG. 1 and in the conjunctive clustering routine 610 in FIG. 2, as well as how each computer may be individually assigned to one or more clusters, as in step 111 in FIG. 1 and in the computer to cluster matching routine 612 in FIG. 2. The clusters may be adjusted in the degree of relaxation permitted, as described above, in terms of which configuration parameters may not be relaxed, and in terms of the inclusion of more sophisticated logic (OR, NOT, etc.) as in step 118 in FIG. 1 and the cluster analyzer and rule formulator 618 in FIG. 2.

Figure 6:
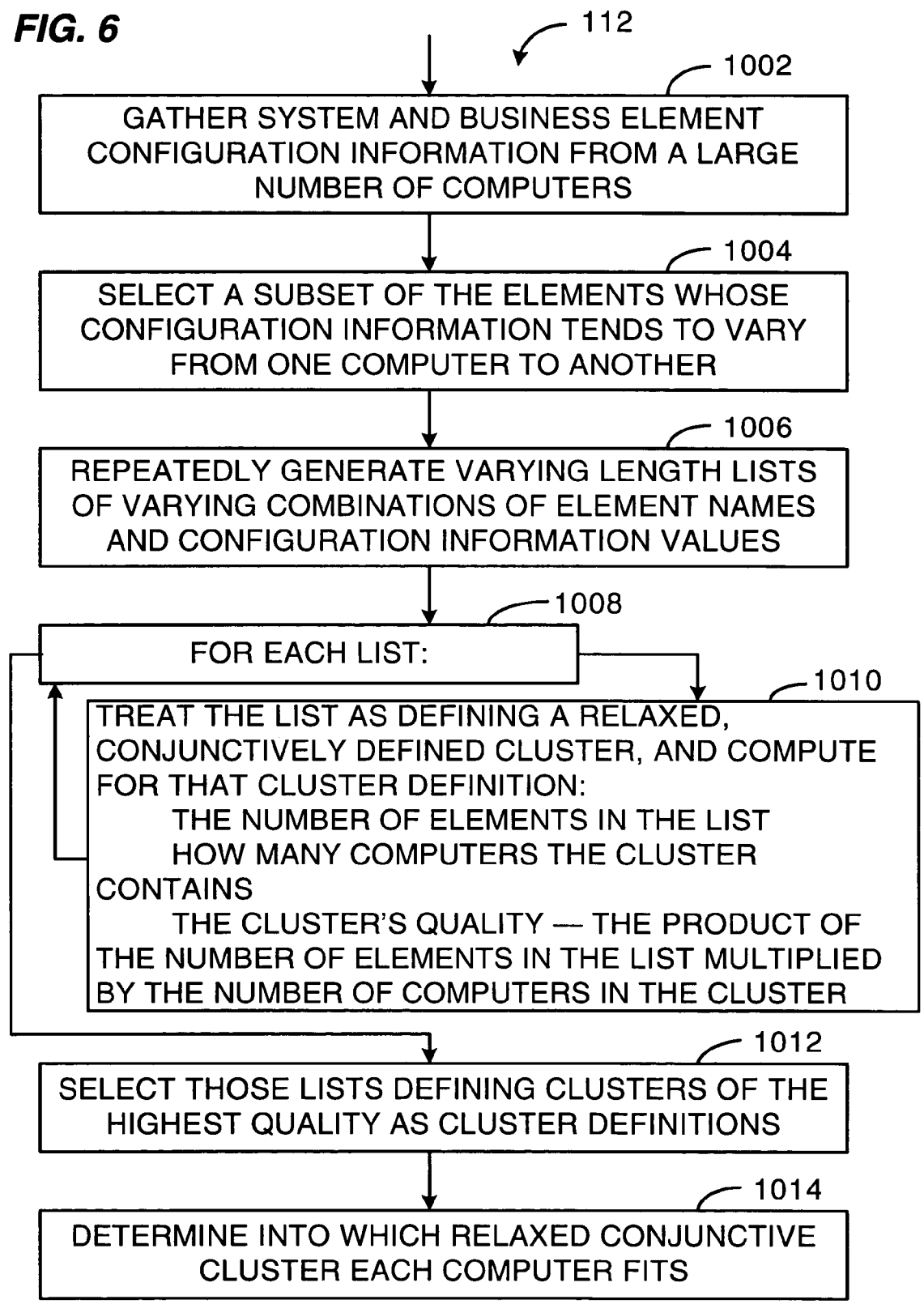
FIG. 6 presents a flow chart of operations performed by an embodiment of the routine that identifies clusters of similarly-configured computers using relaxed conjunctive clustering.

FIG. 6 presents a flowchart of an embodiment of the conjunctive clustering routine 610 (shown in FIG. 2) which carries out the step 112 (shown in FIG. 1) of identifying clusters of similarly-configured computers following in general the clustering method just described above.

At step 1002, configuration information is gathered from a large number of computers. This information can be gathered automatically by remote servers using collectors and then can be stored in one or more tracker databases, as is described in FIG. 8, FIG. 9, FIG. 10, and FIG. 11 and in the text accompanying those figures.

The configuration information that can be gathered from each computer includes identifiable and namable elements of each computer, where the elements can be (for example): physical devices and hardware (processor type, computer model, memory size, parameters descriptive of other storage systems, etc.); logical devices (installed software, installed firmware, kernel parameter settings, volume names and descriptions, directory names and descriptions, files, databases, etc.); information concerning the current state of operation of a computer (which processes are running, which network connections are open, what is the computer's performance or speed of operation, etc.), and some form of industry or business classification identification code, such as a NAICS code or some other national, international, or proprietary classification code. Both business and also system configuration information may be gathered.

This information may be gathered during the routine monitoring of many computers, or it may be gathered especially for this clustering project, or both. Some of this information may come from human support personnel or managers, who may, for example, assign industry or business classification to each computer (or to all the computers within a given enterprise).

All or most of this gathered information is later displayable by the display routine 614 (FIG. 2) when it carries out the display step 114 (FIG. 1). But when carrying out the process of identifying clusters, a subset of the configuration information may be selected (step 1004 in FIG. 6) that includes information values which tend to vary significantly from one computer to the next in a way that makes the selected subset more useful to the process of defining unique clusters of computers and that reduces the number of computations required. This selection process can involve determining the variance of the configuration information values over many different computers and then selecting those that tend to vary quite a bit from computer to computer.

Having selected a subset of configuration information values, these values may be repeatedly combined with each other in many different combinations and in varying numbers (varying length lists of varying combinations of element names and configuration information values) to define many different trial conjunctive clusters of the various configuration information values (step 1006 in FIG. 6), as was illustrated with greatly simplified examples in FIG. 3, FIG. 4, and FIG. 5. There may be some human involvement in the process of creating these definitions.

Next, the quality of each such potential cluster definition is checked out for each of these lists or cluster definitions (step 1008), as was explained above. In step 1010 of FIG. 6, the number of configuration information values in each such cluster definition is determined. Next, the number of computers fitting into the cluster is determined by examining each computer's configuration information to see whether, for each computer, the computer's configuration information values match all, or nearly all, of the values that the tentative cluster definition requires to be present. Some of these, such as the identity and version of the operating system and the identity of the hardware platform, must be present, while other configuration parameters may be among those not present, as was explained above. The number of computers thus fitting within the tentative cluster is then determined and is multiplied by the number of configuration information values to give a measure of the quality of this tentative cluster. Sampling of information can be done to reduce the amount of computation that is required.

Finally, only those tentative clusters of the highest quality, as determined by this computation, are selected as the final set of clusters (step 1012). There may be human involvement in the final process of selecting which clusters to retain. For example, each cluster may be assigned a description that is meaningful to service personnel and to managers. And, as explained above, some configuration information values may be given more weight than others during this process. At step 1014, a determination is made as to into which relaxed conjunctive cluster or clusters each computer fits best.

The discussion just presented focuses upon a first objective of defining the largest conjunctive clusters. These largest clusters are good possible choices for peer groups of computers. However, if (for example) the two largest conjunctive clusters overlap significantly and include substantially the same group of computers, then the two clusters are too similar to be usefully used as separate clusters for maintenance purposes, since they include virtually the same machines all probably having virtually the same set of configuration attributes in common.

The goal here is to define some number k of clusters that are large but also substantially non-overlapping. Thus, two objectives need to be pursued: obtaining large and meaningful clusters, and obtaining substantially non-overlapping clusters.

A cluster may be defined to be large if it includes more than a predetermined fraction of the total set of all computers. Using the mathematical notation introduced above, a biclique $(U^*, W^*)$ is larger if $|U^*| > \rho u$ (where $\rho u$ is a fraction, such as ⅓, of U) and if $|W^*| > \rho w$ (where $\rho w$ is also a fraction, such as ⅓, of W). Large clusters can be found in accordance with the discussion presented above.

Substantially overlapping clusters then need to be eliminated. A large cluster's overlap with another large cluster may be measured mathematically in terms of overlapping edges, as that term is defined above. Given two large bicliques $(U_1, W_1)$ and $(U_2, W_2)$, the first $(U_1, W_1)$ is a delta-cover of the second $(U_2, W_2)$ if the number of edges in $(U_2, W_2)$ that do not belong to the set of edges in $(U_1, W_1)$ is, at most, a δ fraction (δ being again a predefined fraction) of the union of the two sets of edges to be found in the two bicliques $(U_1, W_1)$ and $(U_2, W_2)$ together. Accordingly, the objective of conjunctive clustering is to identify k large bicliques, where no one biclique in the collection of bicliques delta-covers another biclique in the same collection. Using computers, this process can be fully automated quite simply. Some human involvement in decision making, particularly in close cases relating to cluster selection and retention, may improve the meaningfulness of the clusters.

The above method performs clustering by the method of loose conjunctive clustering, which has been described. There are also other methods available that may be used to achieve clustering. For example, there is the farthest point method, where one approximately minimizes the maximum distance from a point (representing a computer configured in a particular way) to its nearest center (representing a cluster). There is also k-means, a method that finds a locally optimal solution to the problem of minimizing the sum of squared distances from points to the nearest center. There is also hierarchical agglomerative clustering (HAC) which proceeds by maximizing the intercluster-intracluster distance, where the intercluster distance is the minimum distance between two points in different clusters and the intracluster distance is the maximum distance between points that lie within the same cluster.

The final step in this process is that of loading into the computer cluster assignment database 604 (FIG. 2) which computer is assigned to each of the finally selected set of the best clusters. This may be done during the determination of the quality of each cluster, or it may be done later as a separate step.

Figure 7:
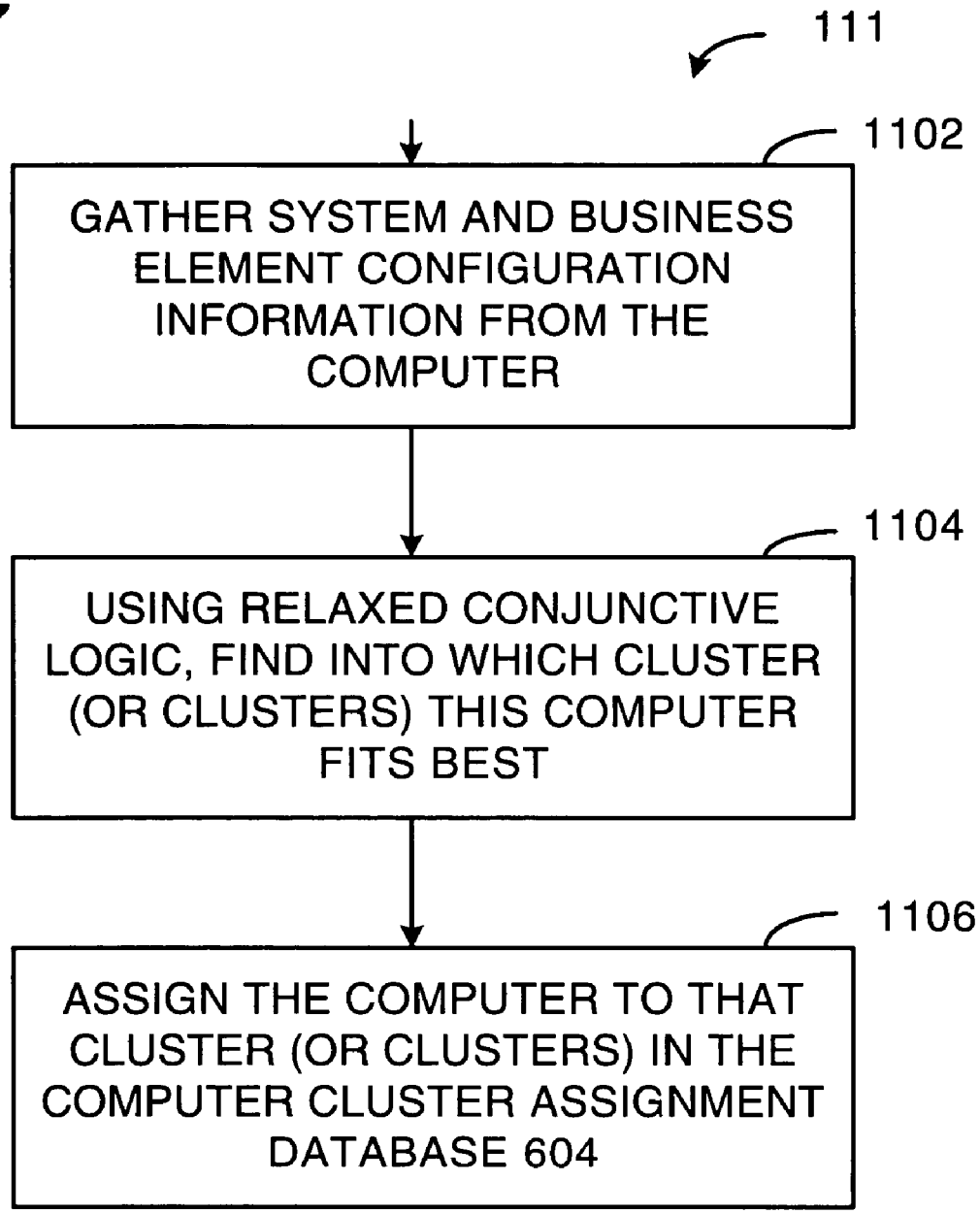
FIG. 7 presents a flow chart of operations performed by an embodiment of the routine that finds which cluster or "peer group" (or clusters or "peer groups") a computer best fits into.

When a new computer is set up, FIG. 7 illustrates the step 111 (FIG. 1) performed by the routine 612 to match that computer to one or more existing clusters. First, the system and business element configuration information which that computer and its peripherals and software contains are gathered (step 1102). This can be done as is explained in FIGS. 8 to 11. Next, at step 1104, and using the relaxed conjunctive logic approach that was explained above, the computer may have its configuration information tested against the definition of each conjunctive cluster to determine if the computer is configured in accordance with the cluster's definition, applied in a relaxed manner as explained above. In this manner, the new computer may be assigned to a matching cluster, or perhaps to several matching clusters, or to the cluster that proves to be the best match (step 1106). Even if the computer does not precisely match the configuration requirements of any cluster, still its configuration information values may be compared to the average values and ranges for the closest matching cluster for maintenance and service purposes, since the points of mismatch with an otherwise closely matching cluster may be the signals of what may be wrong with the computer's configuration.

Automating the Gathering of Configuration Information

Figure 9:
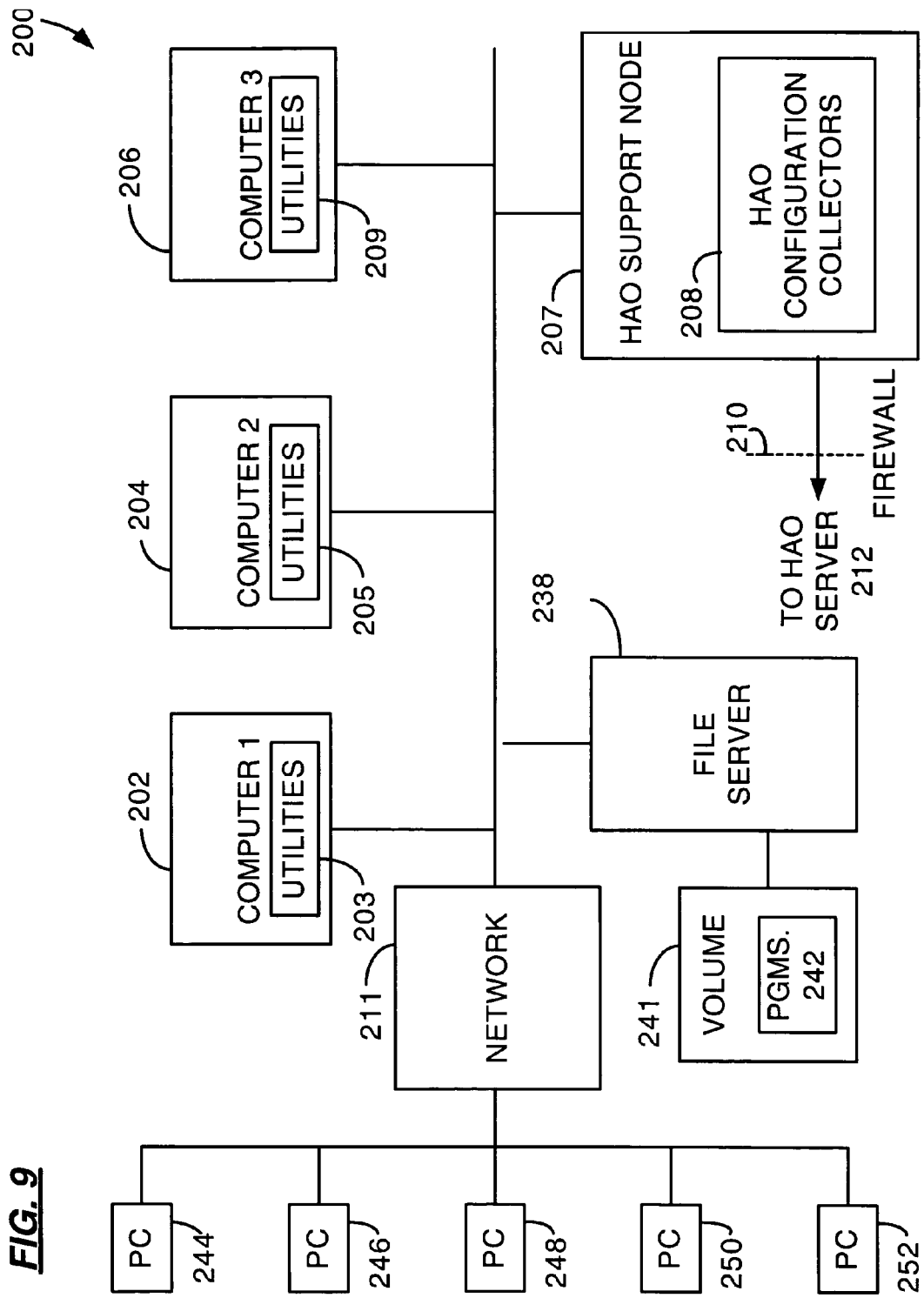
FIG. 9 presents a more detailed block diagram of an embodiment of an enterprise having a high availability observatory.
Figure 11:
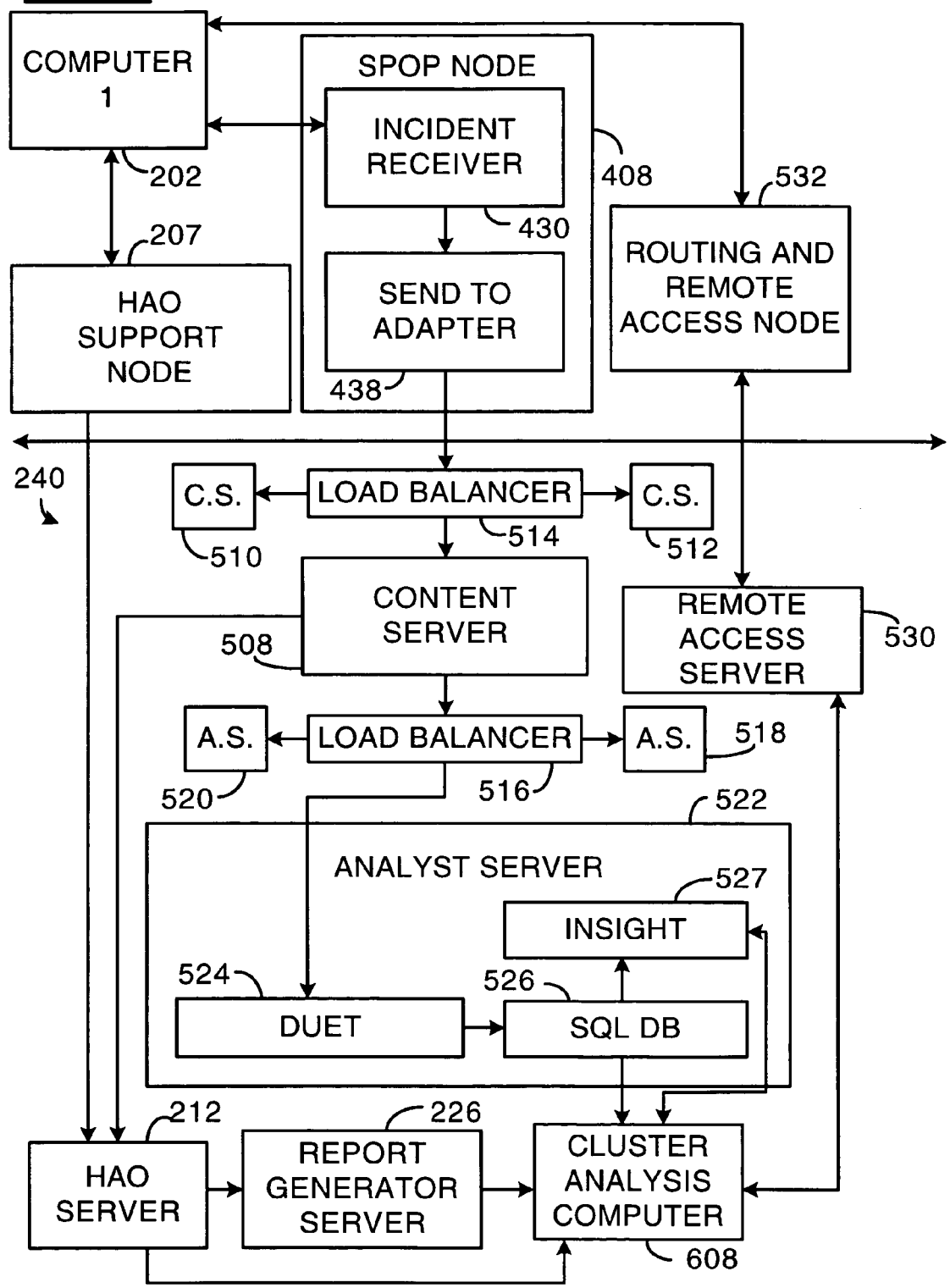
FIG. 11 presents a block diagram of an embodiment of an enterprise and a central site illustrating the use of the chorus and high availability observatory systems to gather information from computers and to access those computers for the purpose of carrying out the steps described in FIG. 1.

Several alternative techniques whereby the configuration parameters of many different monitored devices, including monitored computers (servers, workstations, PCs, etc) as well as interconnect devices (routers, etc.) and other addressable entities (printers, storage arrays, etc.) may be measured and gathered from the computers of one or, perhaps, many enterprise sites in an automated fashion will now be described in conjunction with FIG. 8, FIG. 9, FIG. 10, and FIG. 11. These figures and the accompanying text describe the operation of what may be called a "remote support node:" In one embodiment, it is called a remote "HAO support node" (207 in FIG. 8, FIG. 9, and FIG. 11—HAO is "High Availability Observatory"); and in another embodiment it is called a remote "SPOP node" (408 in FIG. 10 and FIG. 11—"SPOP" is "Support Point of Presence"). These remote support nodes may be installed away from an associated centralized tracker database 214 (FIG. 8) as shown here, or they may be installed together with such a database (not shown). These remote support nodes may be local to an enterprise (not shown) or they may be installed at a central site such as one managed by a maintenance and support organization, as shown here. An embodiment of the present invention can incorporate what is called "configuration tracker" or "HAO" technology, a product of Hewlett Packard (FIG. 8, FIG. 9 and FIG. 11). Another embodiment of the present invention is primarily built on top of, and is designed to enhance and augment, a product called the ServiceNet Platform developed by Motive Communications, Incorporated (FIG. 10 and FIG. 11) which may utilize "SPOP node" technology. Yet other embodiments may combine these two approaches or use entirely different ways to gather information from computers in enterprises. Other ways, including manual and semi-manual data gathering, may also be adopted for gathering the configuration information from computers needed to practice this embodiment of the invention. Or software to gather data may be installed upon every computer in an enterprise.

Referring to FIG. 8, there is shown a block diagram of hardware and software that may be used to implement certain aspects of the method shown in FIG. 1. An enterprise site 200 is, typically, located at a business site. The enterprise site 200 is presumed to include some number of varying types of computers. For illustrative purposes, two are shown: a computer 1 202 and a computer 2 204. The enterprise site 200 in this embodiment of the invention also includes a support node 207 which, for example, may be operated by the manufacturer of the computers at the enterprise site 200, or it may have been placed there by a support organization. The support node 207 includes the customary components of a computer system, including a CPU, a display or other I/O device, a network or communications interface, RAM or ROM or other memory, as well as storage devices such as hard disk and CD-ROM or DVD drives. Other computers described may also include these same customary components as well as keyboards, displays, etc.

At a site having Hewlett-Packard computers, software known as High Availability Observatory ("HAO") available from Hewlett-Packard could be installed on the support node 207, and that software manages a set of software collectors 208 which are arranged to gather configuration information from the other computers 202 and 204. The support node 207 is connected to the computers 202 and 204 by a network 211 which enables the collectors 208 to gather this configuration information. Note that the enterprise site 200 has a firewall 210 that acts as a barrier to prevent unwarranted access to the enterprise site 200. Note that use of a support node in this manner is just one of several different ways in which configuration information may be collected and subjected to analysis.

FIG. 8 also illustrates some of the components that are located at a central site 240 for maintenance and support in this embodiment (other components of the central site 240 appear in FIG. 11). The central site 240 includes an analyzer server 216 typically situated remote from the enterprise site 200. The analyzer server 216 is linked to the enterprise site 200 via an ISDN line or by some other form of wide area network 211, such as the Internet. An HAO server 212 and a report generator server 226 are also typically to be found at the central site 240. The HAO server 212 is linked to the HAO support node 207 by the ISDN line or the Internet through the firewall 210. Files of configuration information generated by the collectors 208 are transferred to the HAO server 212 and are saved in a tracker database 214. These files are retrieved from the tracker database 214 by the analyzer server 216 and are analyzed by a software analyzer 218 that executes (or interprets) rules and other programs taken from an analyzer database 220. The analyzer 218 identifies issues that require attention, and the analyzer 218 places a record of these issues into an issues database 222. A report generator 230, guided by report templates and rules taken from a database 228, and fed with descriptions of the issues obtained from an issue description database 224, later can be used to generate reports, technical reports as well as non-technical reports, and summary reports as well as detailed reports, concerning the state of the computers 202, 204, etc. at the enterprise site 200.

The gathering of configuration information from enterprise sites preferably should be done for many different computers connected to many different enterprises so that the benefits of gathering system and business configuration information from a large number of computers, as indicated in step 104 and the following steps in FIG. 1, can be carried out.

Referring to FIG. 9, the enterprise site 200 configuration will now be described in more detail. As part of the enterprise site 200, three computers (computer 1 202, computer 2 204, and computer 3 206) as well as several enterprise site 200 personal computers 244, 246, 248, 250, and 252 are shown linked together through a local area network 211.

The computers 202, 204, 206 include utilities 203, 205, and 209 that are used to set up and to configure the computers 202, 204, and 206 properly. The enterprise site 200 also typically includes a file server 238 with a volume 241 for storing programs (or software) 242. The file server 238 is linked to the computers 202, 204, and 206 to enable these computers to access and to load the programs 242 from the volume 241 as needed. Some of the computers may not need to have hard disk drives of their own.

As discussed above, the HAO support node 207 is also installed at the enterprise site 200, and it includes a database of HAO configuration collectors 208. The HAO support node 207 is linked to the HAO server 212 at the central site 240, as was explained. A firewall 210 separates the enterprise site 200 from the Internet, as was noted above.

Referring once again to FIG. 8, the analyzer server 216 contains an analyzer database 220 which contains analyzers in the form of programs and rules. These programs and rules implement various tests of the configuration information that are defined by technical experts. The analyzers thereby determine whether there are any issues that need to be addressed and reports generated. For example, some reports may simply restate each of the issues in a nicer format and sorted into a particular order for presentation to a technical team that needs to gain a detailed understanding of all the issues which have arisen. Other reports may be assembled under the control of elaborate rules which first scan and analyze the issue information, possibly comparing it to similar reports generated on earlier occasions to spot trends and conditions that are in need of attention, thereby functioning as a configuration tracker. These reports may generate high level explanations of the state of the enterprise computers and that may be read and understood by lay people, including the management of the enterprise. Trends in the information not apparent in the detailed issue report may also be spotted and brought to light in this manner. Automated systems may automate the scheduling of servicing or even may cause the actual, automated repair of computers in remote locations and enterprises.

Further details concerning the use of HAO servers and collectors at remote sites and tracker databases, analyzers, and report generators at central sites may be found in Van Giel, et al. patent application Ser. No. 09/851,963, filed May 10, 2001, and published Nov. 14, 2002 as U.S. Application Publication No. U.S. 2002/0169738.

Referring now to FIG. 10 and FIG. 11, another system for collecting static and dynamic configuration information (both system and business) is illustrated. In addition to being available on enterprises having Hewlett Packard servers, as illustrated here, this system is also available for use on Windows-based servers and PCs and other Unix and Linux servers and enterprises supporting these types of computers and servers. This system is based upon the use of Motive ServiceNet Platform, which includes programs named Motive Chorus, Motive Insight, Motive Duet, and Management Console, all of which are available from Motive Communications, Inc., Austin, Tex. An embodiment of the present invention, as is best illustrated in FIG. 11, utilizes both the HAO system and the Motive system, in combination, to gather different types of configuration information, both system as well as business configuration information, in accordance with this embodiment of the present invention.

With reference to FIG. 10, the computer 1 202 and the computer 2 204 are shown interconnected by means of the network 211, as in FIG. 8 and FIG. 9. An additional support node is shown, an SPOP ("Service Point of Presence") node

408. This SPOP node 408 (FIG. 10 and FIG. 11), like the HAO support node 207 (FIG. 8 and FIG. 9), is also a special service and maintenance access node that provides for remote communication with the central site 240 (FIG. 11—portions of which are also shown in FIG. 8) for the primary purpose of assisting centrally-located service personnel with maintaining and servicing the enterprise computers and with responding to user requests for assistance. The SPOP node 408 may also be used as a point of access for the purpose of installing new software as well as upgrades and patches.

Let us assume for the moment, for the purpose of briefly describing the ServiceNet Platform, that the computer 1 202 is a typical personal computer (rather than a server). The ServiceNet platform works conventionally (in its unmodified state) in the following manner:

When the user of a (assumed personal) computer 1 202 detects a problem, the user clicks on a "service" icon (on the user's desktop or within an application, for example) that causes a web browser to bring up a web-based user interface 420 which provides the user with a form into which the user may enter a description of the problem. This information is then passed to an incident escalator program (called Motive Chorus) 418, a client program that resides upon the (assumed) personal computer 1 202 and that serves as an interactive assistance tool, capable of running diagnostic scripts. In addition, the (assumed personal) computer 1 202 contains host information 422 and also contact information 424 defining the name, phone number, and e-mail address of the operator of this particular computer to make it possible for service personnel to contact that individual. The escalator 418 may also run prewritten diagnostic scripts 444 (residing on the SPOP node 408) to gather additional configuration data. The incident escalator 418 combines this configuration data, host information 422, and contact information 424 with the user-supplied information defining the incident, and then all of this information is passed on to an incident receiver 430 (also residing on the SPOP node 408) which records the incident in an incident database 436. Then programs called Motive Insight 527 and Motive Duet 524 (residing at the central site 240 on an analyst server 522—see FIG. 11) and another called Management Console 440 (residing on the SPOP node 408 in FIG. 10) enable a service engineer to study the problem and to come up with possible solutions, interacting with the user at the user site 442 (FIG. 10). The engineer may adjust values (step 446).

The modified system shown in FIG. 10 and FIG. 11 utilizes all of these components of the ServiceNet Platform, but redesigns them, enhances them, and augments them to provide additional and expanded services to enhance the types of support that may be provided. In particular, proactive, or anticipatory data gathering actions and reactive, or event-triggered data gathering activities, are added to the ServiceNet Platform's user-reactive ability to log and to track events in a uniform manner, over many different hardware and software entities. In addition, the ServiceNet Platform's data gathering and support assistance abilities are enhanced in ways that permit computers having no user present or no assigned single user, such as servers used as Internet or intranet hosts, storage servers, print servers, etc., may be fully supported as well as personal computers assigned to a user. (In the discussion which follows, the computer 1 202 is no longer assumed to be a personal computer.)

Referring now to FIG. 10, the two computers 202 and 204 are shown and, for the purposes of the discussion which follows, should now be assumed to be two unattended servers existing in an enterprise environment, interconnected by the network 211 to each other and to other enterprise devices. As can be seen, these two servers are each equipped with an incident escalator 418, a web-based user interface 420, host information 422, and contact information 424. But since these servers typically run unattended, it is not normally possible to manually institute the creation of an incident record using the web-based user interface 420, as can be done with a personal computer having a human operator. Instead, automatic event detectors are relied upon to detect significant events.

The computer 1 202 contains both hardware and software 410 that are monitored. Associated with the monitored hardware and software 410 are one or more event annunciators 412. These event annunciators 412 may take widely differing forms depending upon the nature of the hardware or software that is monitored. For example, in some hardware, the event annunciators may be triggered into operation by an event occurring within or initiated by the hardware, such as an interrupt event or possibly a DMA event; or the event annunciators may be placed into operation periodically by some form of timing mechanism to check for specific events or conditions. Thus, for example, in the case of a disk drive, the event annunciators may check records maintained by the disk drive of how frequently the disk drive is encountering certain types of errors, and may compare those records to predefined limit values for error counts. Other event annunciators may check on performance by testing how rapidly software is operating, or they may check on how many hardware errors are occurring during memory accesses, or they may check the basic configuration of the machine and its software, both alone and also in comparison to other servers that are grouped together with this server to form a "cluster."

When the event annunciator 412 discovers an event, it generates an announcement of the event, typically as an SNMP or TCP/IP message, that is routed to an event handler 414.

The event handler 414 is also customized to the monitored hardware or software 410, and it follows up by investigating each event to see whether the event is one that may be ignored, whether the event simply needs to be logged but does not require an immediate response, or whether the event is one that should be reported as an incident that may need to be brought to the attention of service personnel right away. Both the event annunciator 412 and the event handler 414 are custom designed to match the computer 1 202's hardware and operating system. The event handler 414 may reside upon the computer 1 202. But it can reside upon some other server and can communicate with both the event annunciator 412 and also with the monitored hardware or software 410 over the network 211, it may reside on some other machine, or it may even reside upon the SPOP node 408.

If the event handler 414 decides that an incident report needs to be generated, in this embodiment the event handler places the incident generator 416 into operation. The incident generator 416 transforms the event information into the format required by the incident escalator 418 and executes the incident escalator 418, passing the necessary information to that program to cause the creation of an incident report, just as if the information had come from a user through the web based user interface 420 of a personal computer. The incident escalator 418 forwards all of this information to a central support vendor response center as a report of a service or maintenance incident.

In addition to responding to hardware and software events occurring in real time, the incident generator 416 may respond to the periodic execution of configuration gathering scripts and performance measuring scripts that can be included among other prewritten diagnostic scripts 444 (shown installed on the SPOP node 408) which are triggered periodically to survey the general configuration of the computer 1 202 as well as other computers, providing an archival time record of each server's configuration, of its performance, and of how its configuration and performance change over time.

The SPOP node 408 contains an incident receiver 430, another software program provided by Motive Communications. The incident information coming in from the servers and, possibly, from personal computers and other devices as well must be parsed, and this is carried out by an incident parser 432. The particular messages within the incident reports are in accord with a program language design specification that is stored in and defined by an XML file called a parser definition 434. When the incident parser 432 starts up, it reads in the XML parser definition 434 and thereby configures the parser 432 to parse the particular types of messages which the incident escalators 418 are generating for this particular enterprise.

The parsed messages, including incident information, contact information, and host information, are stored in an incident database 436. This enables the user, or an administrator, at the enterprise or user site 442, by means of a web-based interface called a management console 440, also provided by Motive Communications (but heavily modified to serve the purposes described here), to view the individual incident reports and to check out their status—whether opened or closed or whatever. The system administrator or user at the user site 442 may also use a program called Motive Insight 527 (shown at the central site in FIG. 11 within the analyst server 522), and utilizing prewritten diagnostic scripts 444, to browse though the incident information. The user interface web pages that support the web based user interface 420 within the computer 1 202 are also conveniently stored on the SPOP node 408 among the prewritten diagnostic scripts 444. Both the diagnostic scripts 444 and the included user interface pages may be downloaded by service technicians and changed from time to time to keep the entire system current.

FIG. 11 illustrates, at 240, the central site vendor response center which, in one embodiment, is configured to support the operation of both remote HAO support nodes 207 and also SPOP nodes 408 equipped with Motive's ServiceNet Platform. A send to adapter 438 (FIG. 10 and FIG. 11) located on the SPOP node 408 of each enterprise site 200 receives information defining incidents and sends this information to the central site 240. This information crosses the Internet and fire walls and enters into a load balancer 514 which may be a router routing incoming messages relatively evenly to each of several content servers 508, 510, and 512. Content servers are servers typically located outside the main firewall of the central site 240 where they may be accessed readily by PCs and by servers located at enterprise or customer sites, and in particular by send to adapters such as the adapter 438 located on the SPOP node 408 at the enterprise site 200.

If the incoming message is an incident report, then the content server 508 sends it through the central site 240's firewall to a secondary load balancer 516 which routes it to an available content analyst server 522, one of several content analyst servers 518, 520, and 522 that may be available at any given time to handle the load of incoming incident and configuration messages.

These messages first flow to an adapter (not shown) which responds to those parts of the incoming messages which may have been customized beyond what is normally to be found in a Motive Communications incident message. For example, messages disguised as incidents but actually reporting the configuration of a server, such as those generated by configuration scripts, are intercepted and are routed to a configuration database within, possibly, an HAO server 212 that may also be receiving configuration information sent in by an HAO support node 207. Accordingly, a tracker database 214 (shown only in FIG. 8) within the HAO server 212 is able to maintain a historic record of each enterprise computer's configuration and of changes in configuration over time. These may be further processed by an analyzer server 216 (shown only in FIG. 8) and by a report generator server 226 or they may be accessed directly by a service engineer stationed at a workstation (not shown) upon demand.

The remaining Motive Insight messages flow directly into Motive Communication's Duet program 524 where they are organized and stored within an SQL database 526. The service engineer then may utilize the Motive Insight program 527 to retrieve and to view these incident messages and to process the incidents appropriately. The service engineer may place a phone call or send an e-mail message to the responsible contact person at the enterprise site 200. In one embodiment of the invention, the service engineer is also able to utilize a remote access server 530 and to use it to gain direct access to a routing and remote access node 532 (that might also be the SPOP node 408 or the HAO support node 207) using a highly secure communication technique that actually allows the service engineer to take direct control of the SPOP node 408 with the service engineer's display and keyboard functioning as if they were connected directly to the SPOP node 408, so that the service engineer may directly access and examine the computer 1 202 and other servers at the enterprise site 200 to exercise them, display their parameters, and investigate any problem directly. This arrangement is described more fully in the patent application Ser. No. 10/135,398 filed on May 1, 2002 (Soto, et al.). The service engineer also has available at his or her fingertips all the configuration information gathered by the collectors 208 and present within the tracker database 214 (FIG. 8) within the HAO server 212 (FIG. 8 and FIG. 11) as well as information in the issues database 222 (FIG. 8) and various reports 232 (FIG. 8) which the service engineer can generate whenever the need arises While several embodiments of the invention have been described, further modifications and changes will occur to those skilled in the art. Accordingly, the claims appended to and forming a part of this specification are intended to cover all such modifications and changes as fall within the true spirit and scope of the invention.

What is claimed is:

1. A method for identifying clusters of similarly-configured computers comprising:
    gathering system and business configuration information values from a set of computers;
    analyzing at least a portion of the system and business configuration information values gathered from the set of computers as well as the numbers of computers that are configured in various ways;
    using the result of the analysis as a guide, selecting logical expressions of configuration information values for use as definitions of one or more clusters of similarly-configured computers, the selection process generally maximizing a number of configuration information value specifications; and for one or more clusters so defined and selected, generating one or more statistics or limit values or both from one or more configuration information values gathered from a subset of computers included in the one or more clusters;

and collecting the one or more statistics or limit values or both in a database for later use characterizing each cluster and as an aide in diagnosing problems in computer members of the cluster.

2. A method in accordance with claim 1 wherein the analyzing step further comprises choosing for analysis a random sample of the set of computers.

3. A method in accordance with claim 2 wherein the generating step further comprises generating statistics or limit values or both from a random sample of the subset of computers included in the one or more clusters.

4. A method in accordance with claim 1 wherein the generating step further comprises generating statistics or limit values or both from a random sample of the subset of computers included within the one or more clusters.

5. A method in accordance with claim 1 wherein the system configuration information values included within each selected cluster definition comprise a type of computer and a type of operating system.

6. A method in accordance with claim 5 wherein the system configuration information values included within each selected cluster definition further comprise at least some kernel configuration information values.

7. A method in accordance with claim 1 which further comprises the step of comparing the configuration of a given computer to that of the computers in such a cluster by comparing at least one configuration information value gathered from the given computer to a corresponding one or more statistics or limit values generated for at least one of the clusters.

8. A method in accordance with claim 7 wherein the generating step further comprises generating performance statistics, and wherein the comparing step further comprises comparing these performance statistics to one or more of the given computer's performance configuration information values.

9. A method in accordance with claim 1 wherein the business configuration information values gathered further comprise a business classification.

10. A method in accordance with claim 1 wherein the business configuration information values gathered further comprise a identity of business application software installed on the computers.

11. A method in accordance with claim 1 wherein the business configuration information values gathered further comprise a identity of businesses application software actually operated on the computers.

12. A method in accordance with claim 1 wherein the selecting step further comprises including in the definition of at least some clusters at least one business configuration information value and at least one system configuration information value.

13. A method in accordance with claim 1 wherein the selecting step further comprises including in the definition of at least some clusters configuration information values specifying one type of computer and one type of operating system.

14. A method in accordance with claim 13 wherein the selecting step further comprises including in the definition of at least some clusters at least one business classification configuration information value.

15. A method in accordance with claim 13 wherein the selecting step further comprises including in the definition of at least some clusters at least one business configuration information value indicating a identity of business application software.

16. A method in accordance with claim 1 wherein the analyzing step further comprises using a conjunctive clustering process to define potential clusters and to determine how many computers are included within each potential cluster.

17. A method in accordance with claim 16 wherein the conjunctive clustering process used is a relaxed conjunctive clustering process that includes at least some computers within a cluster even when their configurations do not fully satisfy the cluster's logical definition.

18. A method in accordance with claim 16 wherein the selecting step further comprises including in the definition of at least some clusters at least one business configuration information value and at least one system configuration information value.

19. A method in accordance with claim 1 wherein the analyzing step further comprises using logical expressions to combine configuration information value requirements to define potential clusters and to determine how many computers are included within each potential cluster, the logic being applied in a relaxed manner such that at least some computers may be included within a cluster even when their configurations do not fully satisfy the cluster's definition.

20. A system for identifying from a set of computers clusters of similarly-configured computers comprising:

a data gathering system connecting to the set of computers arranged to gather system and business configuration information values from the computers in the set;

a clustering routine that can analyze at least a portion of the gathered system and business configuration information values as well as determine how many computers are configured in a given way, and that uses the results of such an analysis to guide in the selection of logical expressions of configuration information values for use as definitions of one or more clusters of similarly-configured computers, the selection process generally maximizing the number of computers included within each cluster and also generally maximizing maximizing a number of configuration information value specifications included within the definition of each cluster a cluster parameter routine that generates one or more information values representing statistics or limit values or both and corresponding to at least some of the configuration information values from a subset of computers included in the one or more clusters.

21. A system in accordance with claim 20 wherein the clustering routine includes a sampling routine that enables the clustering routine to analyze the configuration information values gathered from a random sample of computers.

22. A system in accordance with claim 21 wherein the cluster parameter routine also generates information values representing statistics or limit values or both by processing configuration information values gathered from a random sample of the set of computers included in the one or more clusters.

23. A system in accordance with claim 20 wherein the cluster parameter routine generates information values representing statistics or limit values or both by processing configuration information values gathered from a random sample of the computers included in the one or more clusters.

24. A system in accordance with claim 20 wherein the data gathering system gathers system configuration information values including the type of computer and the type of operating system, and the clustering routine includes at least this information in the definition of each selected cluster.

25. A system in accordance with claim 24 wherein the data gathering system also gathers at least some kernel information, and the clustering routine includes at least some kernel information in the definition of at least some selected clusters.

26. A system in accordance with claim 20 which further comprises a computer versus cluster comparison routine having access to the information values generated by the cluster parameter routine that can compare the configuration of a given computer to that of the computers in such a cluster by comparing at least one configuration information value gathered from a given computer to a corresponding one or more statistics or limit values generated for at least one of the clusters.

27. A system in accordance with claim 26 wherein the data gathering system gathers performance configuration information values, wherein the cluster parameter routine generates performance statistics or limit values or both, and wherein the comparison routine is further designed to compare at least some performance configuration information values of a given computer to performance statistics or limit values of one or more clusters.

28. A system in accordance with claim 20 wherein the data gathering system gathers data comprising business classification configuration information values.

29. A system in accordance with claim 20 wherein the data gathering system gathers business configuration information values comprising a identity of business application software installed on a computer.

30. A system in accordance with claim 20 wherein the data gathering system gathers business configuration information values comprising a identity of business application software actually operated on a computer.

31. A system in accordance with claim 20 the clustering routine includes in the definition of at least some clusters at least one system configuration information value and at least one business configuration information value.

32. A system in accordance with claim 20 wherein the clustering routine includes within the definition of at least some clusters configuration information values specifying one type of computer and one type of operating system.

33. A system in accordance with claim 32 wherein the clustering routine includes within the definition of at least one cluster at least one business classification configuration information value.

34. A system in accordance with claim 32 wherein the clustering routine includes within the definition of at least some clusters at least one business configuration information value specifying a identity of business application software.

35. A system in accordance with claim 20 wherein the clustering routine comprises a conjunctive clustering routine that defines potential clusters and that determines how many computers are included in each potential cluster.

36. A system in accordance with claim 35 wherein the clustering routine further comprises a relaxed conjunctive clustering routine that includes at least some computers within a cluster even when their configurations do not fully satisfy the cluster's logical definition.

37. A system in accordance with claim 35 wherein the data gathering system gathers from the computers and the clustering routine includes in the definition of at least some clusters at least one system configuration information value and at least one business configuration information value.

38. A system in accordance with claim 20 wherein the clustering routine utilizes logical expressions to combine configuration information value requirements to define potential clusters and to determine how many computers are included within each potential cluster, the logic being applied in a relaxed manner such that at least some computers may be included within a cluster even when their configurations do not fully satisfy the cluster's definition.

39. A system in accordance with claim 20 which further comprises:
   a computer versus cluster comparison routine having access to the information values generated by the cluster parameter routine that can compare the configuration of a given computer to that of the computers in such a cluster by comparing at least one configuration information value gathered from a given computer to a corresponding one or more information values generated for at least one of the clusters;
   wherein the cluster parameter routine generates statistics; and
   wherein the comparison routine further comprises a comparison mechanism that compares the configuration information values of a given computer to the corresponding statistics of a cluster.

40. A system in accordance with claim 20 which further comprises:
   a computer versus cluster comparison routine having access to the information values generated by the cluster parameter routine that can compare the configuration of a given computer to that of the computers in such a cluster by comparing at least one configuration information value gathered from a given computer to a corresponding one or more information values generated for at least one of the clusters;
   wherein the cluster parameter routine generates statistics limit values, and
   wherein the comparison routine further comprises a comparison mechanism that compares the configuration information values of a given computer to the corresponding limit values of a cluster.

41. A system for identifying from a set of computers clusters of similarly-configured computers comprising:
   data gathering means connecting to the set of computers for gathering system and business configuration information values from the computers in the set;
   analysis and selecting means for analyzing at least a portion of the gathered system and business configuration information values, for determining how many computers are configured in a given way, and for using the results of such an analysis to guide in the selection of logical expressions of configuration information values for use as definitions of one or more clusters, the selection process generally maximizing the number of computers included within each cluster and also generally maximizing a number of configuration information value specifications included within the definition of each cluster; and
   means for generating one or more information values representing statistics or limit values or both and corresponding to at least some of the configuration information values from a subset of computers included in the one or more clusters.

* * * * *